(12) United States Patent
Sashida

(10) Patent No.: US 10,498,959 B2
(45) Date of Patent: Dec. 3, 2019

(54) FOCUS CONTROL DEVICE, FOCUS CONTROL METHOD AND STORAGE MEDIUM

(71) Applicant: Casio Computer Co., Ltd., Shibuya-ku, Tokyo (JP)

(72) Inventor: Kenzo Sashida, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 16/351,103

(22) Filed: Mar. 12, 2019

(65) Prior Publication Data

US 2019/0297272 A1    Sep. 26, 2019

(30) Foreign Application Priority Data

Mar. 26, 2018    (JP) ................................. 2018-058005

(51) Int. Cl.
*H04N 5/232*    (2006.01)
(52) U.S. Cl.
CPC ... *H04N 5/232411* (2018.08); *H04N 5/23245* (2013.01); *H04N 5/23293* (2013.01); *H04N 5/232125* (2018.08)

(58) Field of Classification Search
CPC ....... H04N 5/232411; H04N 5/232125; H04N 5/23245; H04N 5/23293
See application file for complete search history.

(56) References Cited

U.S. PATENT DOCUMENTS

2018/0091737 A1*    3/2018    Kadambala .............. G02B 7/09

FOREIGN PATENT DOCUMENTS

JP    10-282395 A    10/1998

* cited by examiner

*Primary Examiner* — Nicholas G Giles
(74) *Attorney, Agent, or Firm* — Seed IP Law Group LLP

(57) ABSTRACT

A CPU acquires a first focal position where a photographic subject is in focus by following a predetermined control rule, performs first control processing of controlling the motor such that the focus lens stops at the first focal position, and performs second control processing of controlling the motor such that the focus lens stops at a second focal position different from the first focal position. The second focal position is a focal position where a user does not recognize that the photographic subject is out of focus in an output from the imaging apparatus, and power consumption for stopping the focus lens is lower than power consumption for driving the motor so as to stop the focus lens at the first focal position.

14 Claims, 16 Drawing Sheets

FIG. 2

| FOCUS ADDRESS | SUBJECT DISTANCE [mm] | NUMBER OF RECORDING PIXELS | | DISPLAY SECTION | |
|---|---|---|---|---|---|
| | | FRONT DEPTH OF FIELD [mm] | BACK DEPTH OF FIELD [mm] | FRONT DEPTH OF FIELD [mm] | BACK DEPTH OF FIELD [mm] |
| 1 | 100000 | 980 | ∞ | 78 | ∞ |
| 2 | 2500 | 700 | ∞ | 75 | ∞ |
| 3 | 1250 | 550 | ∞ | 73 | ∞ |
| 4 | 830 | 450 | 5630 | 71 | ∞ |
| ... | ... | ... | ... | ... | ... |
| 31 | 82 | 76 | 90 | 40 | ∞ |
| 32 | 80 | 74 | 87 | 39 | ∞ |
| 33 | 77 | 71 | 84 | 38 | ∞ |
| 34 | 75 | 69 | 81 | 37 | 12500 |
| 35 | 72 | 67 | 78 | 36 | 2100 |
| 36 | 70 | 66 | 76 | 35 | 1150 |
| 37 | 68 | 64 | 74 | 34 | 790 |
| ... | ... | ... | ... | ... | ... |

FIG. 12

| FOCUS ADDRESS | SUBJECT DISTANCE [mm] | NUMBER OF RECORDING PIXELS | | DISPLAY SECTION | |
|---|---|---|---|---|---|
| | | FRONT DEPTH OF FIELD [mm] | BACK DEPTH OF FIELD [mm] | FRONT DEPTH OF FIELD [mm] | BACK DEPTH OF FIELD [mm] |
| 1 | 100000 | 980 | ∞ | 78 | ∞ |
| 2 | 2500 | 700 | ∞ | 75 | ∞ |
| 3 | 1250 | 550 | ∞ | 73 | ∞ |
| 4 | 830 | 450 | 5650 | 71 | ∞ |
| ... | ... | ... | ... | ... | ... |
| 31 | 82 | 76 | 90 | 40 | ∞ |
| 32 | 80 | 74 | 87 | 39 | ∞ |
| 33 | 77 | 71 | 84 | 38 | ∞ |
| 34 | 75 | 69 | 81 | 37 | 12500 |
| 35 | 72 | 67 | 78 | 36 | 2100 |
| 36 | 70 | 66 | 76 | 35 | 1150 |
| 37 | 68 | 64 | 74 | 34 | 790 |
| ... | ... | ... | ... | ... | ... |

CORRECTION

DEVIATION CORRECTION ORIGINAL

PRIOR ART

FOCUS CONTROL DEVICE, FOCUS CONTROL METHOD AND STORAGE MEDIUM

CROSS-REFERENCE TO RELATED APPLICATION

This application is based upon and claims the benefit of priority from the prior Japanese Patent Application No. 2018-058005, filed Mar. 26, 2018, the entire contents of which are incorporated herein by reference.

BACKGROUND

Technical Field

The present disclosure relates to a focus control device, a focus control method and a storage medium.

Description of the Related Art

Conventionally, a focus control device for imaging apparatuses is known which is used to control the focal position of a focus lens driven by a motor so as to achieve an AF (Auto Focus) operation or a continuous AF operation (which are hereinafter collectively and simply referred to as "AF operation"). As this type of focus control device, for example, a device is known which controls a focal position via a Voice Coil Motor (VCM).

FIG. 15 is a partial cross-sectional view showing an example of the structure of a general conventional imaging apparatus equipped with a voice coil motor M. This imaging apparatus includes a focus lens 2, a mover 3 constituted by a coil or the like wound around the focus lens 2, a yoke (lens barrel) 5 including a stator 4 constituted by a magnet or the like arranged opposing the mover 3, and an elastic member (such as spring or rubber) 6 which pulls the focus lens 2 downward in the drawing together with the mover 3. The mover 3, the stator 4, and the like constitutes the voice coil motor M. By an electric current being supplied to the coil of the mover 3 to cause an interaction between a magnetic field occurring in the mover 3 and a magnetic field by the magnet of the stator 4 (Fleming's left-hand rule), the focus lens 2 integrally provided with the mover 3 is driven to a front-and-back direction (up-and-down direction in the drawing) indicated by arrow A (reciprocating motion). As the electric current that is being supplied to the coil of the mover 3 (hereinafter referred to as "VCM current") is increased, the focus lens 2 integrally provided with the mover 3 is moved further forward (upward in the drawing). Normally, this focus lens 2 is being pulled backward (downward in the drawing) by the elastic member (such as spring or rubber) 6 as indicated by arrow B. Therefore, when the focus lens 2 is to be fixed at a predetermined position, the VCM current is required to be continuously supplied.

FIG. 16 is a conceptual diagram showing an example of a relation between the position of the focus lens 2 and the VCM current. In FIG. 16, the vertical axis represents the VCM current and the horizontal axis represents the position of the focus lens 2 and a subject distance. When the VCM current is changed from a low current to a higher current, the focus lens 2 is moved from the back (downward in FIG. 15) to the front (upward in FIG. 15), as shown in FIG. 16. As shown in FIG. 16, the position of the focus lens 2 has a one-to-one relation with the subject distance. When the subject distance is closer to the ∞ side, the focus lens 2 focuses with it being positioned on the back side. When the subject distance is closer to the close point (shortest imaging distance) side, the focus lens 2 focuses with it being positioned on the front side.

The reason for having the relation shown in FIG. 16 is that, since the focus lens 2 is constantly being forced backward (downward in FIG. 15) by the elastic member (such as spring or rubber) 6, the force of the elastic member 6 increases when the focus lens 2 is moved forward (upward in FIG. 15) and, as a result, the VCM current is required to be increased. As evident from above, in the imaging apparatus where the focus lens 2 is driven by using the voice coil motor M, it can be said that the VCM current continuously changes in accordance with the focal position of the focus lens 2.

Conventionally, in an AF operation during live view display, whether a photographic subject has been brought into focus is judged while the VCM current is being changed to move the focus lens 2 as shown in FIG. 16. Then, when the photographic subject is brought into focus, the focus lens 2 is stopped at that focal position. Here, since the focus lens 2 is constantly being forced backward (downward in FIG. 15) by the elastic member (such as spring or rubber) 6 as described above, the VCM current corresponding to that focal position is required to be continuously supplied in order to keep the focus lens 2 stopped and maintain the focal state. Accordingly, a problem arises in that power consumption during an AF operation becomes higher. In particular, in the example shown in FIG. 16, when the photographic subject is brought into focus on the close point side (shortest imaging distance), a high VCM current is required to be continuously supplied, and therefore power consumption becomes higher.

Especially in an imaging apparatus having a secondary battery as a power supply, reducing power consumption is important. Accordingly, for example, in Japanese Patent Application Laid-Open (Kokai) Publication No. 10-282395, a technique has been proposed in which, when a pulse motor of a 1-2 phase excitation mode is used as a motor for driving a focus lens and the stop position (focal position) of the focus lens is a two-phase stop position, the focus lens is moved by an amount equal to one pulse so as to be moved to and stopped at a one-phase stop position, and the electric current is interrupted, whereby power saving is achieved.

The two-phase stop position is between two phases. Accordingly, in order to keep the stop position stable, at least a holding current is required to be continuously flowed through the coil even in a stop state. By contrast, as for the one-phase stop position, the magnetic poles of the rotor and the stator are opposed to each other, and therefore the stop position is held by the magnetic force of the magnet, so that the electric current can be interrupted.

BRIEF SUMMARY

In accordance with one aspect of the present disclosure, there is provided a focus control device that is applied to an imaging apparatus where power consumption of a motor continuously changes in accordance with a focal position change of a focus lens driven by the motor, and controls a focal position of the focus lens, comprising: a processor, wherein the processor (i) acquires a first focal position where a photographic subject is in focus by following a predetermined control rule, (ii) performs first control processing of controlling the motor such that the focus lens stops at the first focal position, and (iii) performs second control processing of controlling the motor such that the focus lens stops at a second focal position different from the first focal position, and wherein the second focal position is a focal position where a user does not recognize that the photographic subject is out of focus in an output from the imaging apparatus, and power consumption for stopping the focus lens is lower than power consumption for driving the motor so as to stop the focus lens at the first focal position.

In accordance with another aspect of the present disclosure, there is provided a focus control method that is applied to an imaging apparatus where power consumption of a motor continuously changes in accordance with a focal position change of a focus lens driven by the motor, and controls a focal position of the focus lens, comprising: acquiring a first focal position where a photographic subject is in focus by following a predetermined control rule; performing first control processing of controlling the motor such that the focus lens stops at the first focal position; and performing second control processing of controlling the motor such that the focus lens stops at a second focal position different from the first focal position, wherein the second focal position is a focal position where a user does not recognize that the photographic subject is out of focus in an output from the imaging apparatus, and power consumption for stopping the focus lens is lower than power consumption for driving the motor so as to stop the focus lens at the first focal position.

In accordance with another aspect of the present disclosure, there is provided a non-transitory computer-readable storage medium having stored thereon a program that is executable by a computer in a focus control device that is applied to an imaging apparatus where power consumption of a motor continuously changes in accordance with a focal position change of a focus lens driven by the motor and controls a focal position of the focus lens, the program being executable by the computer to actualize functions comprising: acquiring a first focal position where a photographic subject is in focus by following a predetermined control rule; performing first control processing of controlling the motor such that the focus lens stops at the first focal position; and performing second control processing of controlling the motor such that the focus lens stops at a second focal position different from the first focal position, wherein the second focal position is a focal position where a user does not recognize that the photographic subject is out of focus in an output from the imaging apparatus, and power consumption for stopping the focus lens is lower than power consumption for driving the motor so as to stop the focus lens at the first focal position.

The above and further objects and novel features of the present disclosure will more fully appear from the following detailed description when the same is read in conjunction with the accompanying drawings. It is to be expressly understood, however, that the drawings are for the purpose of illustration only and are not intended as a definition of the limits of the disclosure.

BRIEF DESCRIPTION OF THE SEVERAL VIEWS OF THE DRAWINGS

FIG. 2 is a conceptual diagram showing an example of a correspondence relation among a subject distance (focal position), a front depth of field and a back depth of field in accordance with the number of recording pixels of a recording medium, and a front depth of field and a back depth of field in accordance with the resolution of a display section, according to the first embodiment;

FIG. 12 is a conceptual diagram for describing a method of determining a focus lens stoppable range according to a third embodiment, for which the focal position deviation amount of the focus lens has been taken into consideration and in which out of focus does not occur and power saving can be achieved;

DETAILED DESCRIPTION

Embodiments of the present disclosure will hereinafter be described with reference to the drawings.

First Embodiment

Figure 1:
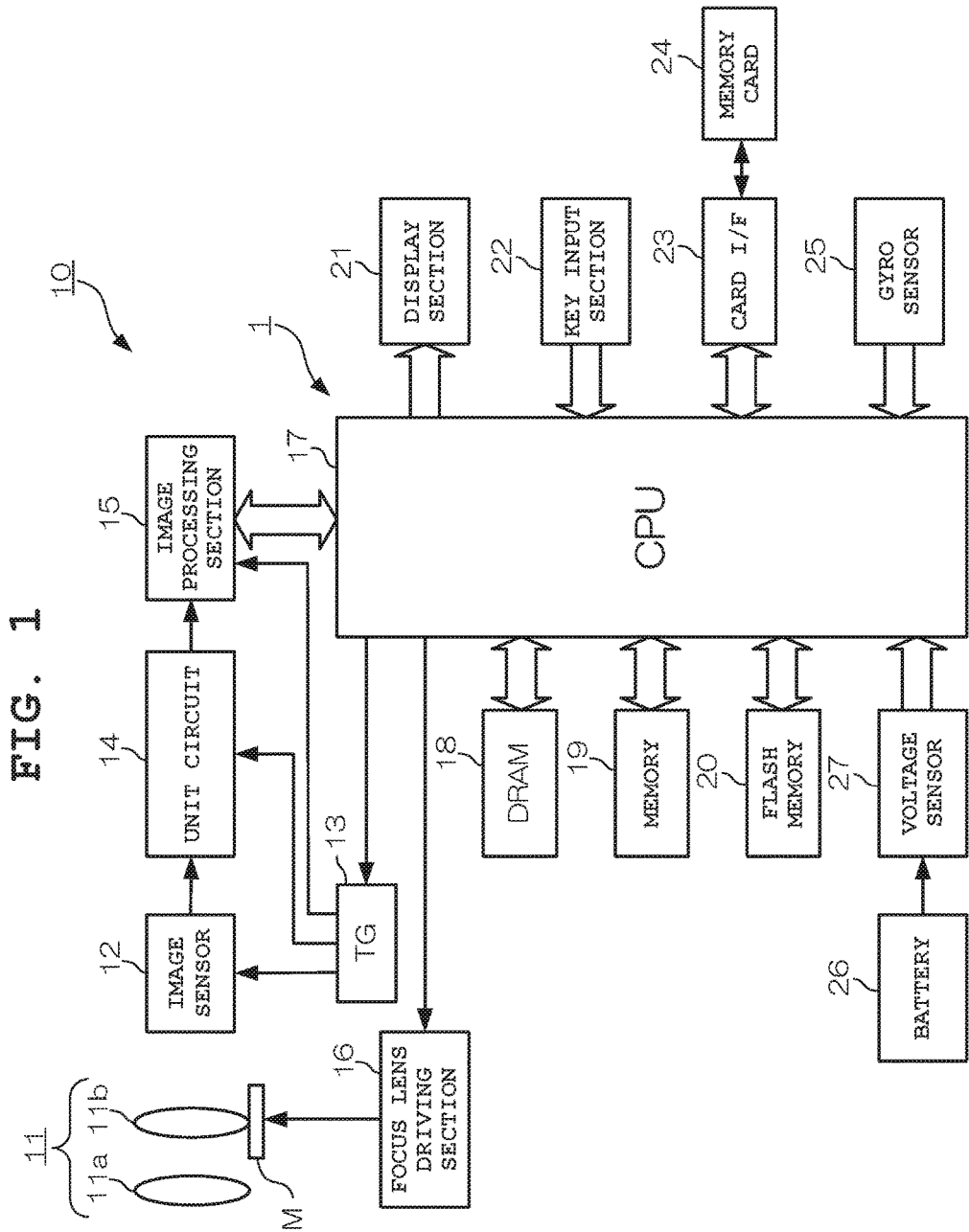
FIG. 1 is a block diagram showing the structure of a digital camera according to a first embodiment of the present invention.
Figure 15:
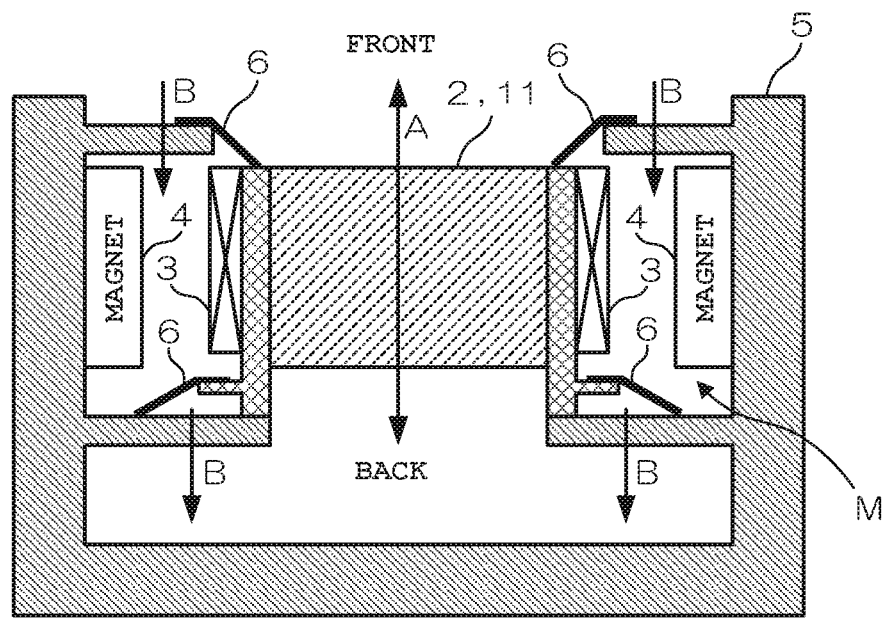
FIG. 15 is a partial cross-sectional view of an example of the structure of a focus control device using a voice coil motor.

FIG. 1 is a block diagram showing the structure of a digital camera 10 according to a first embodiment of the present disclosure In the drawing, the digital camera 10 includes a voice coil motor M described above by using FIG. 15, an imaging lens 11, an image sensor 12, a TG (Timing Generator) 13, a unit circuit 14, an image processing section 15, a focus lens driving section 16, a CPU (Central Processing Unit) 17, a DRAM (Dynamic Random Access Memory) 18, a memory (Read-Only Memory) 19, a flash memory 20, a display section 21, a key input section 22, a card I/F 23, a memory card 24 and a gyro sensor 25. Also, the digital camera 10 is provided with a focus control device 1, and this focus control device 1 is constituted by the focus lens driving section 16, the CPU 17, and the like.

The imaging lens 11 includes a zoom lens 11a and a focus lens 11b. To the focus lens 11b, the force of the elastic member 6 (not shown in FIG. 1) is being applied, as described in FIG. 15. This focus lens 11b is driven by the voice coil motor M. The image sensor 12, which has an electronic shutter function (timing control for exposure and data output by the TG (Timing Generator) 13 described later), converts the light of a photographic subject projected via the imaging lens 11 into an electrical signal, and outputs the electrical signal to the unit circuit 14 as an imaging signal. This image sensor 12 is constituted by a CCD (Charge-Coupled Device) image sensor, CMOS (Complementary Metal-Oxide Semiconductor) image sensor, or the like, and is driven in accordance with a timing signal generated by the TG 13.

The unit circuit 14 is constituted by a CDS (Correlated Double Sampling) circuit which performs correlated double sampling on an imaging signal outputted from the image sensor 12 and retains the resultant signal, an AGC (Automatic Gain Control) circuit which performs automatic gain adjustment on the imaging signal after the sampling, and an A/D converter which converts the analog imaging signal after the automatic gain adjustment into a digital signal. This unit circuit 14 is driven in accordance with a timing signal generated by the TG 13. Each imaging signal from the image sensor 12 is sent via the unit circuit 14 to the image processing section 15 as a digital signal.

The image processing section 15 performs image processing (such as pixel interpolation processing, y correction, generation of a luminance color difference signal, white balance processing, exposure correction processing, superimposition and conversion processing, filtering processing, and face detection processing) on image data sent from the unit circuit 14, performs compression and decompression processing on image data (such as compression and decompression of JPEG, M-JPEG or MPEG data), performs trimming of a captured image, performs digital zooming on a captured image, or the like. This image processing section 15 is driven in accordance with a timing signal generated by the TG 13.

The focus lens driving section 16 together with the CPU 17 serves as means of driving the focus lens 11b via the voice coil motor M, and drives the focus lens 11b by supplying, to the coil of the voice coil motor M, a VCM current based on a control signal (focus address described later in detail) sent from the CPU 17. In particular, in the first embodiment, the focus lens driving section 16 performs an AF operation and a continuous AF operation (hereinafter collectively and simply referred to as "AF operation") and, after the AF operation (after focusing), drives the focus lens 11b to a position where the focus lens 11b can be stopped with a lower VCM current in order to achieve power saving.

The CPU 17 is a one-chip microcomputer which controls each section of the digital camera 10. In particular, in the first embodiment, the CPU 17 controls an AF operation by supplying a control signal (focus address) indicating a VCM current to the focus lens driving section 16.

Figure 16:
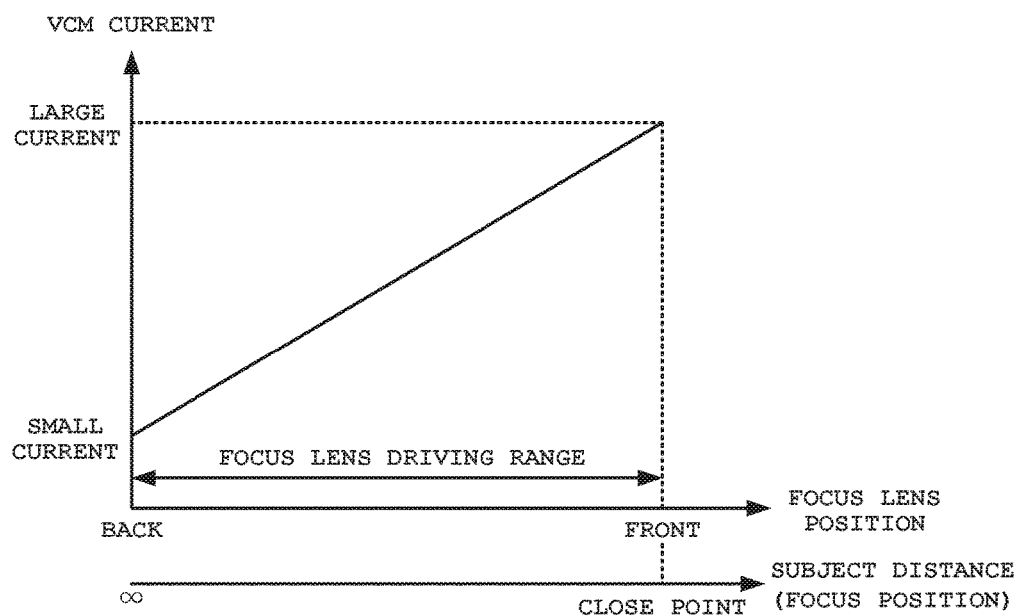
FIG. 16 is a conceptual diagram showing an example of a relation between the position of the focus lens and a VCM current.

Also, the CPU 17 performs focus power-saving control as control for an AF operation. In this focus power-saving control, the CPU 17 performs the following control operation in order to reduce the power consumption of the voice coil motor M, based on the relation between the position of the focus lens 11b and the VCM current described above by using FIG. 16. That is, based on the focal position of the focus lens 11b when a photographic subject is brought into focus by, for example, normal contrast AF control (this focal position is hereinafter referred to as a provisional focal position; a focus address at the time of focusing), a subject distance corresponding to that provisional focal position is specified. Then, from among a plurality of depths of field in accordance with the resolution of the display section 21 which correspond to subject distances from a close point to ∞, a plurality of depths of field including the specified subject distance are selected. Then, the maximum subject distance is specified from among a plurality of subject distances corresponding to the selected plurality of depths of field. When the focus lens 11b is moved to a position corresponding to this maximum subject distance (hereinafter referred to as a "focal position"), the depth of field (front depth of field and back depth of field) at that position always includes the subject distance (provisional focal position) that is the actual distance to the photographic subject.

That is, when the focus lens 11b is moved to the above-described focal position, the photographic subject in a live view image described later is not recognized by the user as being out of focus. In other words, as long as the focus lens 11b is moved to any point within a range from the provisional focal position to the focal position (which is hereinafter referred to as a "focus lens stoppable range", but does not include the provisional focal position), the photographic subject does not go out of focus. In addition, the focus lens 11b can be stopped with a VCM current lower than that when the focus lens 11b is stopped at the provisional focal position, as evident from FIG. 16. Note that, here, phase-difference AF control may be performed instead of the contrast AF control.

Also, the CPU 17 supplies the focus lens driving section 16 with a control signal (focus address) indicating a VCM current for moving the focus lens 11b to a focal position where a photographic subject does not go out of focus within a range where the focus lens 11b can be stopped with the lower VCM current (focus lens stoppable range), such as the above-described focal position corresponding to the maximum subject distance.

The above-described focus address indicates a stop position of the focus lens 11b within the movable range of the focus lens 11b, and corresponds to a VCM current value for moving and stopping the focus lens 11b to and at that position. That is, when the CPU 17 supplies a predetermined focus address to the focus lens driving section 16, the focus lens driving section 16 supplies a VCM current in accordance with the supplied focus address to the coil of the voice coil motor M. As a result, the focus lens 11b is moved to a position indicated by the focus address. That is, from this focus address, the current position of the focus lens 11b can be recognized.

The DRAM 18 is used as a buffer memory which temporarily stores image data captured by the image sensor 12 and sent to the CPU 17, and is also used as a working memory for the CPU 17. The above-described CPU 17 controls the image processing section 15 to perform the above-described processing on a captured image stored in the DRAM 18. In the memory 19, a program required for controlling each section of the digital camera 10 by the CPU 17 and data required for controlling each section are stored. The CPU 17 performs processing by following this program.

The flash memory 20 is a recording medium which stores image data captured by the image sensor 12.

The display section 21 includes, for example, a color liquid-crystal display and its driving circuit. In an imaging wait state, the display section 21 displays images captured by the image sensor 12 as a live view image. In the playback of stored images, the display section 21 displays stored images read from the flash memory 20 or the memory card 24 and decompressed. Also, during image capturing, the display section 21 sequentially displays the number of stored images, a recording continuation time, and the like. When image capturing is not being performed, the display section 21 displays a remaining battery level, a free space of a memory, and a current imaging condition (setting details). The key input section 22 includes operation keys such as a shutter button, an imaging mode setting dial, a zoom switch, a SET key, and a cross key, and outputs an operation signal in accordance with the user's key operation to the CPU 17.

To the card I/F 23, the memory card 24 is removably attached via a card slot of the main body of the digital camera 10 which is not shown in the drawing. As with the flash memory 20, the memory card 24 is a recording medium which stores image data and the like captured by the image sensor 12.

The gyro sensor 25, which detects the displacement of the housing (terminal housing) of the digital camera 10, is a triaxial sensor capable of detecting acceleration vectors in front-and-back and left-and-right directions (substantially horizontal direction) and up-and-down directions (substantially vertical direction). The CPU 17 judges the orientation of the digital camera 10 based on a detection signal from the gyro sensor 25. In particular, in the present embodiment, the CPU 17 detects an occurrence of focal position deviation of the focus lens 11b based on a detection signal from the gyro sensor 25 (details will be described later).

The digital camera 10 further includes a battery 26 as its power supply and a voltage sensor 27 for detecting the voltage of the battery 26. The voltage sensor 27 is a sensor for detecting the voltage (remaining amount) of the battery 26 of the digital camera 10, and the CPU 17 judges the charge state of the battery 26, that is, the battery voltage (remaining amount) based on a detection signal from the voltage sensor 27.

FIG. 2 is a conceptual diagram showing an example of a correspondence relation among a subject distance (focal position), a front depth of field and a back depth of field in accordance with the number of recording pixels of image data that is stored on a recording medium of the digital camera 10, and a front depth of field and a back depth of field in accordance with the resolution of the display section 21, according to the first embodiment. Note that the depth of field herein refers to a range where a photographic subject is in focus (front and back areas on an optical axis), and the depth of field=the front depth of field+the back depth of field. That is, the photographic subject is seen to be in focus as long as it is in the range from the front depth of field to the back depth of field. Here, a predetermined depth of field set in advance in the digital camera 10 is relatively low, and the depth of field in accordance with the number of the recording pixels is more than this predetermined depth of field. Also, the resolution of the display section 21 is lower than the resolution of a captured image (recorded image) which is equivalent to the number of the recording pixels, and therefore the depth of field in accordance with the resolution of the display section 21 is more than the depth of field in accordance with the number of the recording pixels.

In FIG. 2, focus addresses indicate positions (corresponding to subject distances from the close point to ∞) within the movable range of the focus lens 11b, and correspond to VCM current values for moving and stopping the focus lens 11b to and at those positions. That is, each focus address corresponds to a focal position of the focus lens 11b, and is used as an address for reading a depth of field in accordance with the resolution of the display section 21 (front depth of field and back depth of field) and a subject distance corresponding to the depth of field from the LUT (Look Up Table) 30 described later. Each subject distance is a distance from a photographic subject to the image sensor 12, and is uniquely defined from a focus address (focal position) of the focus lens 11b at the time of focusing. For example, when a photographic subject is brought into focus at a focus address "33", the subject distance is "77 mm".

As described above, a subject distance is found from a focal position (focus address) of the focus lens 11b when a photographic subject is brought into focus. Also, based on the found subject distance, a front depth of field and a back depth of field in accordance with the number of recording pixels in that case and a front depth of field and a back depth of field in accordance with the resolution of the display section 21 can be determined. Each front depth of field and each back depth of field depend on an aperture value (F value) at the time of focusing. Note that FIG. 2 shows front depths of field and back depths of field in the case of a predetermined aperture value (F value).

Equations for calculating a front depth of field T1 and a back depth of field T2 are shown below.

$$H = \frac{f \times f}{C \times F} \qquad \text{[Equation 1]}$$

Here, H is a hyperfocal distance (distance where an end of the back depth of field is infinite), f is a focal distance, C is a minimum circle of confusion (aberration), and F is an aperture value (F value). More specifically, the hyperfocal distance H and the focal distance f are predetermined values defined by lens characteristics and the like. The aperture value F is a predetermined value unless it is variable. The minimum circle of confusion (permissible circle of confusion) C has a predetermined value, corresponds to the predetermined depth of field, and is normally lower than a minimum circle of confusion in accordance with the number of recording pixels and a minimum circle of confusion in accordance with the resolution of the display section 21 (normal minimum circle of confusion <minimum circle of confusion in accordance with the number of recording pixels <minimum circle of confusion in accordance with the resolution of the display section). Also, the front depth of field T1 and the back depth of field T2 are as follows:

$$T1 = \frac{B(H+f)}{H+B} \qquad \text{[Equation 2]}$$

$$T2 = \frac{B(H-f)}{H-B} \qquad \text{[Equation 3]}$$

Here, B is a subject distance (a distance from a photographic subject to the image sensor 12).

For example, when the subject distance is 75 [mm], the front depth of field and the back depth of field in accordance with the number of recording pixels are 69 [mm] and 81

[mm], the front depth of field and the back depth of field in accordance with the resolution of the display section 21 are 37 [mm] and 12500 [mm], as shown in FIG. 2. Note that a front depth of field and a back depth of field in accordance with the number of recording pixels and a front depth of field and a back depth of field in accordance with the resolution of the display section 21 for the other subject distances can be similarly calculated using the above-described Equations 1 to 3.

Figure 3:
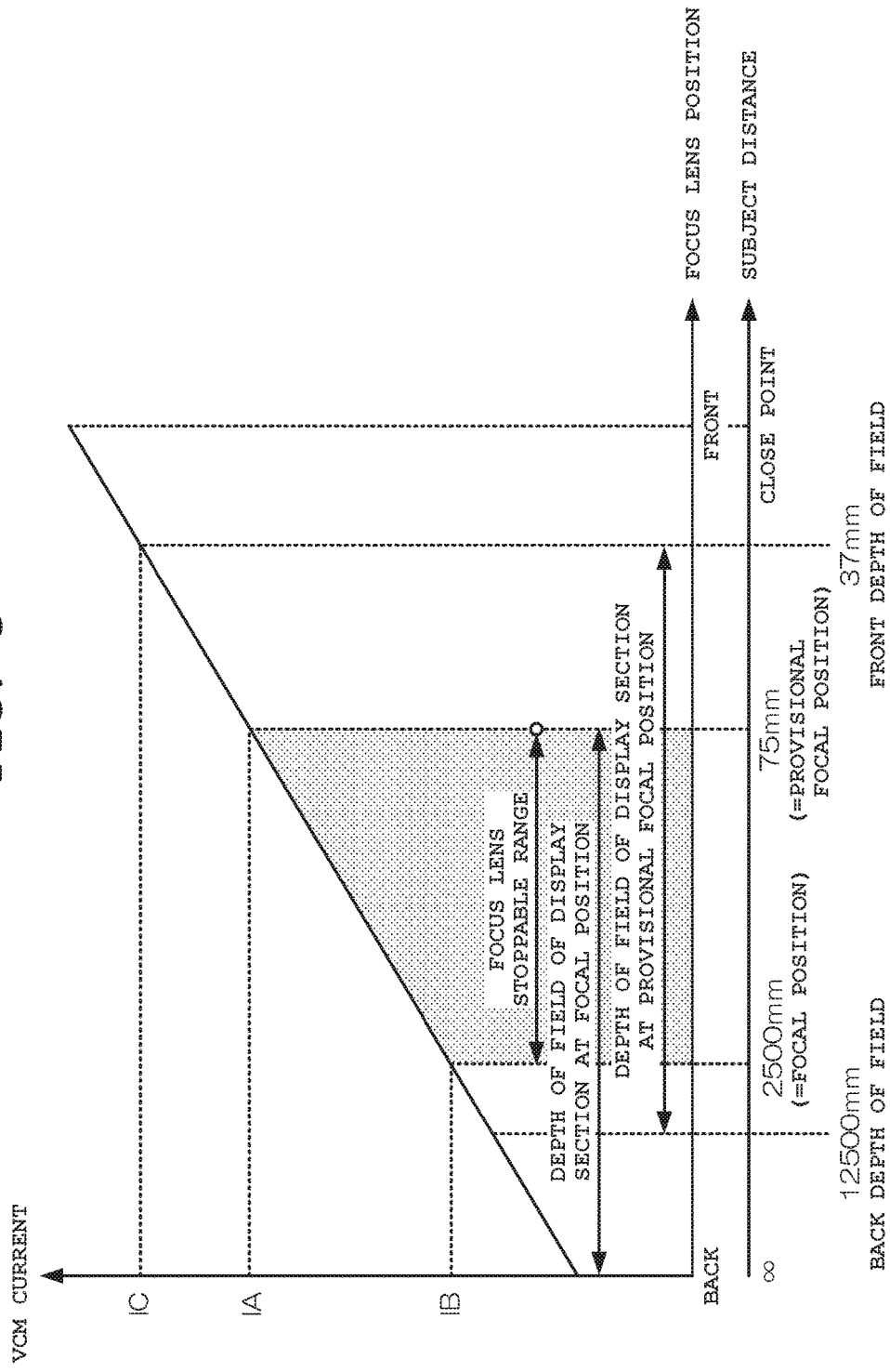
FIG. 3 is a conceptual diagram showing an example of a focus lens stoppable range according to the first embodiment, in which a user does not recognize that a photographic subject is out of focus and power saving can be achieved.

FIG. 3 is a conceptual diagram showing an example of a focus lens stoppable range according to the first embodiment. In FIG. 3, the vertical axis represents a VCM current supplied to the voice coil motor M for driving the focus lens 11b and the horizontal axis represents a position of the focus lens 11b and a subject distance corresponding to that position. In the first embodiment, as with the case shown in FIG. 15 and FIG. 16, the front of the focus lens 11b is taken as a close point side (shortest imaging distance) with respect to a photographic subject, and the back of the focus lens 11b is taken as ∞ of the subject distance. For example, when a photographic subject comes into focus by the focus lens 11b by the above-described normal AF control at a position at a subject distance "75 mm", a front depth of field and a back depth of field in accordance with the resolution of the display section 21 are 37 [mm] and 12500 [mm], respectively. From these, a range of "DEPTH OF FIELD OF DISPLAY SECTION AT PROVISIONAL FOCAL POSITION" shown in FIG. 3 is defined.

That is, when a provisional focal position that is a focal position (subject distance) found by normal AF control is 75 [mm], a live view image is displayed on the display section 21 in a state in which the user recognizes that a photographic subject that is present in a subject distance range from 37 [mm] to 12500 [mm] has come into focus. In other words, when the focus lens 11b is at a focal position where a depth of field including a subject distance corresponding to a provisional focal position can be acquired, the photographic subject is recognized to have come into focus. In the case of FIG. 2 and FIG. 3, when a provisional focal position (subject distance) is 75 [mm], depths of field including 75 [mm] among the depths of field of the display section 21 correspond to, for example, 34-790, 35-1150, . . . , 73-∞, and 75-∞ [mm]. Subject distances corresponding to these depths of field are 68, 70, . . . , 1250, and 2500 [mm], respectively.

That is, as long as the photographic subject is brought into focus at one of these subject distances, since any of these subject distances 68, 70, . . . , 1250, and 2500 [mm] includes the provisional focal position (75 [mm]), the photographic subject is recognized to be in focus in a live view image. That is, as long as the focus lens 11b is moved to a focal position corresponding to one of these subject distances, it is recognized that the photographic subject at an original subject distance of 75 [mm] has come into focus.

However, it can be found with reference to FIG. 3 that, if the focal position (subject distance) is shorter than 75 [mm] among the subject distances corresponding to the respective depths of field, the VCM current cannot be decreased. To decrease the VCM current, the subject distance corresponding to any of the above-described depth of fields including the provisional focal position (subject distance) is required to be more than the provisional focal position (75 [mm]). Furthermore, if the corresponding subject distance is a maximum subject distance among the plurality of subject distances corresponding to the plurality of depths of field including the provisional focal position, the VCM current can be decreased most.

As described above, in the present embodiment, from among a plurality of depths of field in accordance with the resolution of the display section 21 corresponding to subject distances from a close point to ∞, a plurality of depths of field including a provisional focal position are selected. Subsequently, a maximum subject distance among the plurality of subject distances corresponding to the selected plurality of depths of field is specified. Then, the focus lens 11b is moved to and stopped at a focal position corresponding to the specified maximum subject distance. This causes a state to be maintained in which a photographic subject at the original subject distance "75 mm (provisional focal position)" is recognized to be in focus in a live view image, and can make the VCM current at minimum. As will be described further below, instead of moving the focus lens 11b to the focal position corresponding to the maximum subject distance, a range on a focal position side corresponding to the maximum subject distance rather than the provisional focal position (however, the range does not include the provisional focal position; a white circle in FIG. 3) may be set as a focus lens stoppable range and the focus lens 11b may be moved to and stopped at any position in the focus lens stoppable range.

When the focal position of the focus lens 11b is to be held at "75 mm" as shown in FIG. 3, it is required to continuously supply VCM current IA. By contrast, with reference to FIG. 2, in the plurality of depths of field in accordance with the resolution of the display section 21 corresponding to the subject distances from the close point to ∞, the maximum subject distance among the plurality of subject distances (68, 70, . . . , 1250, and 2500 [mm]) corresponding to the plurality of depths of field (34-790, 35-1150, . . . , 73-∞, 75-∞) including the focal position "75 mm" is 2500 [mm].

When the focal position of the focus lens 11b is held at a position corresponding to the maximum subject distance (2500 mm) where the photographic subject is recognized to be in focus in a live view image, it is only required to supply VCM current IB (<IA). That is, it can be found that, if the focus lens 11b is held at the focal position corresponding to the maximum subject distance "2500 mm" derived from the depths of field in accordance with the resolution of the display section 21 based on the provisional focal position (subject distance "75 mm") that is a focal position in normal AF control, the VCM current to be supplied can be minimized while it is visually recognized by the user that the photographic subject is in focus in the live view image As described above, even when the focus lens 11b is moved to the focal position "2500 mm" that is the maximum subject distance derived from the depths of field in accordance with the resolution of the display section 21 based on the provisional focal position (subject distance "75 mm"), it is visually recognized in the live view image of the display section 21 that the photographic subject is in focus. In particular, the AF operation is performed also during a live view operation where images are not recorded. Therefore, even when the focus lens 11b is positioned at the focal position (maximum subject distance "2500 mm"), the photographic subject is seen to be in focus in the live view image of the display section 21, and therefore no drawback occurs to the user.

Thus, in the first embodiment, in order to further lower the VCM current to be supplied to the focus lens 11b, that is, in order to achieve power saving, based on a provisional focal position (for example, 75 mm) acquired by normal AF control, a plurality of depths of field including the provisional focal position is selected from among a plurality of depths of field in accordance with the resolution of the display section 21 which correspond to subject distances from a close point to ∞. Subsequently, the maximum subject distance (for example, 2500 mm) is specified from among a plurality of subject distances corresponding to the selected plurality of depths of field. Then, the VCM current is controlled such that the focus lens 11b is moved to and stopped at a focal position corresponding to the specified maximum subject distance. As a result, power saving is achieved without causing trouble (out of focus) in the live view display. Note that a method for determining a stop position when the focus lens 11b is moved to and stopped at a position in a focus lens stoppable range under a predetermined condition as described above will be described later.

Figure 4:
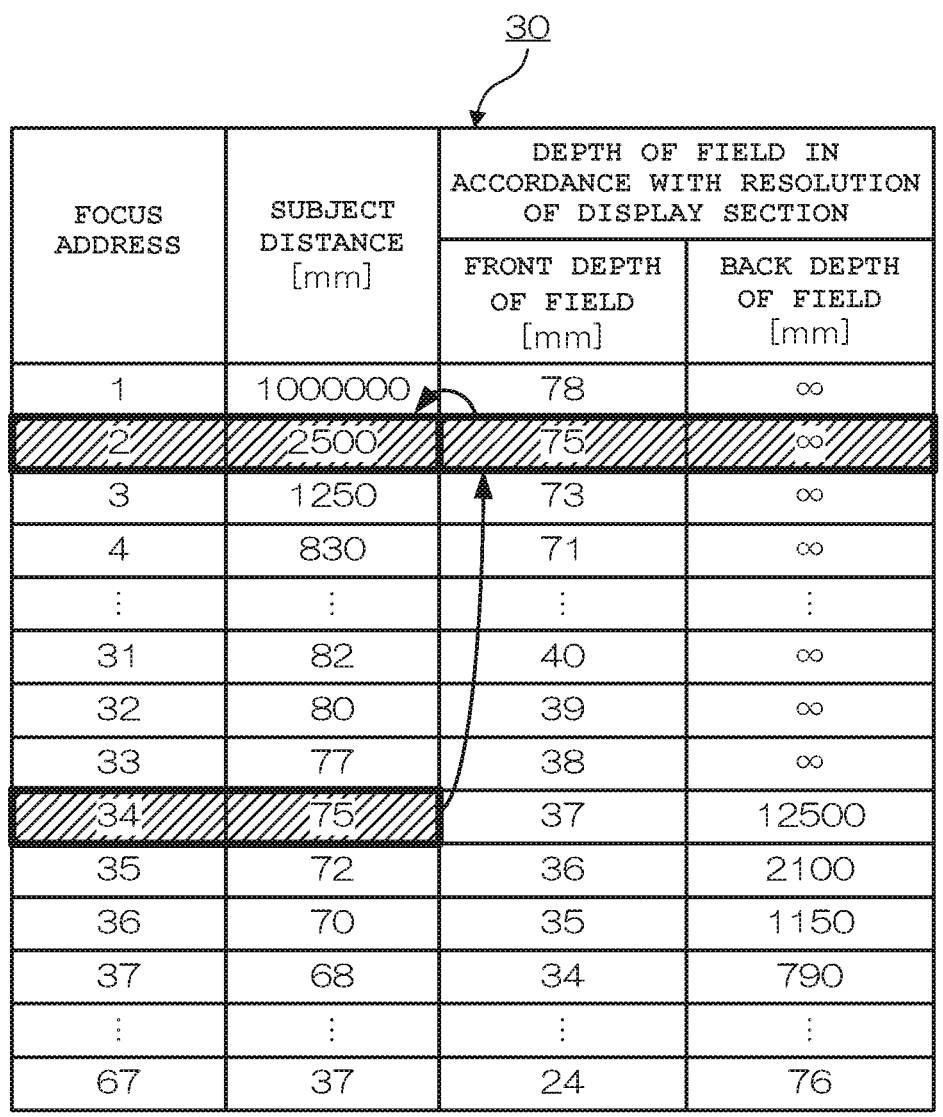
FIG. 4 is a conceptual diagram showing a LUT (Look Up Table) 30 for deriving a subject distance corresponding to a depth of field including a provisional focal position in a stoppable range of a focus lens 11b, according to the first embodiment.

FIG. 4 is a conceptual diagram of the LUT 30 for deriving a subject distance corresponding to a depth of field including a provisional focal position in a stoppable range of a focus lens 11b, according to the first embodiment. As described above, in the first embodiment, a photographic subject is once brought into focus by normal AF control, and a subject distance corresponding to a provisional focal position (focus address) that is a focal position of the focus lens 11b at that time is specified. Subsequently, from among a plurality of depths of field in accordance with the resolution of the display section 21, a plurality of depths of field including the provisional focal position is selected. Next, the maximum subject distance is specified from among subject distances corresponding to the selected plurality of depths of field. Then, the focal position of the focus lens 11b is moved within a focus lens stoppable range (range not including the provisional focal position) which is a range on a focal position side corresponding to the maximum subject distance rather than the provisional focal position and also equal to or less than this focal position, and is held (stopped) at that focal position.

Thus, in the first embodiment, the LUT 30 is provided to store a subject distance and a front depth of field and a back depth of field in accordance with the resolution of the display section 21 for each focus address associated with a position within the movable range of the focus lens 11b (the range of a subject distance from ∞ to a close point (shortest imaging distance), as shown in FIG. 4. This LUT 30 is set in advance at the time of manufacture of the digital camera 10 and is stored in the memory 19. When a photographic subject is brought into focus by normal AF control, the CPU 17 acquires a focus address corresponding to a provisional focal position that is a focal position of the focus lens 11b at that time, and access the LUT 30 with the focus address. Also, the CPU 17 selects a plurality of depths of field including the provisional focal position from a plurality of depths of field in accordance with the resolution of the display section 21 corresponding to subject distances from the close point to co, and specifies the maximum subject distance from among a plurality of subject distances corresponding to the selected plurality of depths of field. Then, the CPU 17 controls the VCM current of the voice coil motor M such that the focus lens 11b is moved to and stopped at a focal position corresponding to the maximum subject distance.

As shown in the above-described Equations 1 to 3, the depths of field in accordance with the resolution of the display section 21 depend on an aperture value at the time of image capturing. Among imaging apparatuses, there are an apparatus where an aperture value (F value) is fixed and an apparatus where an aperture value (F value) is automatically set in accordance with an imaging situation or is set by a user. In the case of the imaging apparatus where an aperture value (F value) is fixed, the LUT 30 shown in FIG. 4 is provided which stores back depths of field for a predetermined aperture value. By contrast, in the case of the apparatus where an aperture value (F value) is automatically set in accordance with an imaging situation or is set by a user, for example, the LUT 30 shown in FIG. 4 is provided for each aperture value that can be taken at the time of image capturing. Then, at the time of AF control, the corresponding LUT 30 is selected based on an aperture value at that time. Subsequently, the selected LUT 30 is accessed with a focus address corresponding to a provisional focal position (subject distance), and a final focal position (longest subject distance) is found.

Next, operations of the above-described first embodiment are described.

First, an operation is described which switches control for an AF operation to focus power-saving control of moving the focal position of the focus lens 11b to a point where power consumption is lower. In the following descriptions, a switching operation based on a charge state (remaining battery level) of the battery 26, a switching operation based on an operation mode, and a switching operation based on a combination of the remaining battery level and the operation mode are described.

Figure 5:
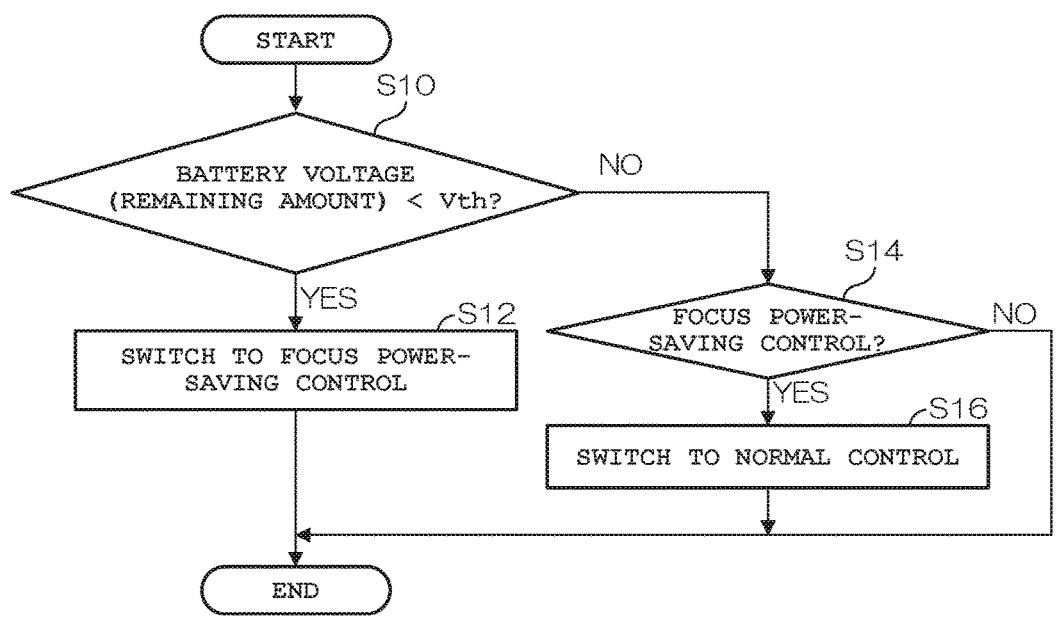
FIG. 5 is a flowchart for describing a first switching operation for switching to focus power-saving control according to the first embodiment.

FIG. 5 is a flowchart for describing a first switching operation of switching control for an AF operation to focus power-saving control, in the first embodiment. The first switching operation is characterized in switching control for an AF operation to focus power-saving control or normal control in accordance with the battery voltage (remaining amount) of the battery 26. The focus power-saving control is, as described above, control for achieving power saving in an AF operation by setting the focal position of the focus lens 11b at a point of a maximum subject distance among a plurality of subject distances corresponding to a plurality of depths of field including a provisional focal position acquired by normal AF control. The normal control herein is control in which, in an AF operation, the focus lens 11b is stopped at a provisional focal position acquired by normal AF control.

The processing shown in FIG. 5 is repeatedly performed by the CPU 17 at the time of power-on and at predetermined time intervals. First, the CPU 17 judges whether the battery voltage (remaining amount) of the battery 26 is lower than a predetermined threshold Vth (Step S10). When the battery voltage (remaining amount) is lower than the predetermined threshold Vth (YES at Step S10), the CPU 17 switches control for an AF operation to focus power-saving control (Step S12), and ends the processing.

On the other hand, when the battery voltage (remaining amount) is equal to or more than the predetermined threshold Vth (NO at Step S10), the CPU 17 judges whether focus power-saving control has been set as control for an AF operation (Step S14). When focus power-saving control has been set (YES at Step S14), the CPU 17 switches control for AF operation to normal control (Step S16), and ends the processing.

On the other hand, when focus power-saving control has not been set (NO at Step S14), the CPU 17 ends the processing without switching control for an AF operation (by maintaining normal control).

Figure 6:
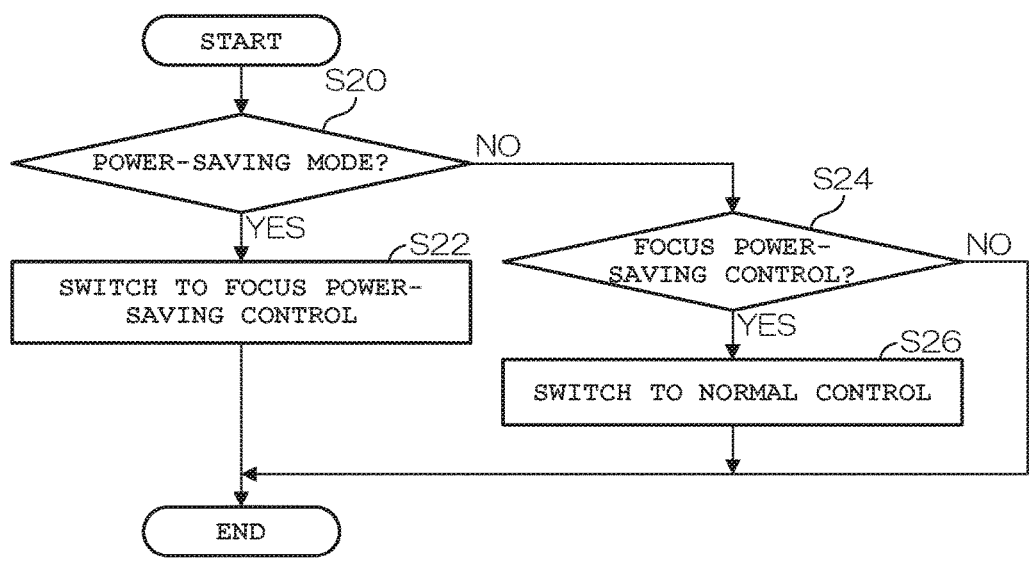
FIG. 6 is a flowchart for describing a second switching operation for switching to focus power-saving control according to the first embodiment.

FIG. 6 is a flowchart for describing a second switching operation of switching control for an AF operation to focus power-saving control, in the first embodiment. The second switching operation is characterized in switching control for an AF operation to focus power-saving control or normal control based on whether a power saving mode has been set as an operation mode. Note that the operation mode of the camera is set by the user as necessary.

The processing shown in FIG. 6 is repeatedly performed by the CPU 17 at the time of power-on and at predetermined time intervals. First, the CPU 17 judges whether the power-saving mode has been set as an operation mode (Step S20). When the power-saving mode has been set (YES at Step S20), the CPU 17 switches control for an AF operation to focus power-saving control (Step S22), and ends the processing.

Conversely, when the power-saving mode has not been set (NO at Step S20), the CPU 17 judges whether focus power-saving control has been set as control for an AF operation (Step S24). When focus power-saving control has been set (YES at Step S24), the CPU 17 switches control for an AF operation to normal control (Step S26), and ends the processing.

Conversely, when focus power-saving control has not been set (NO at Step S24), the CPU 17 ends the processing without switching control for an AF operation (by maintaining normal control).

Figure 7:
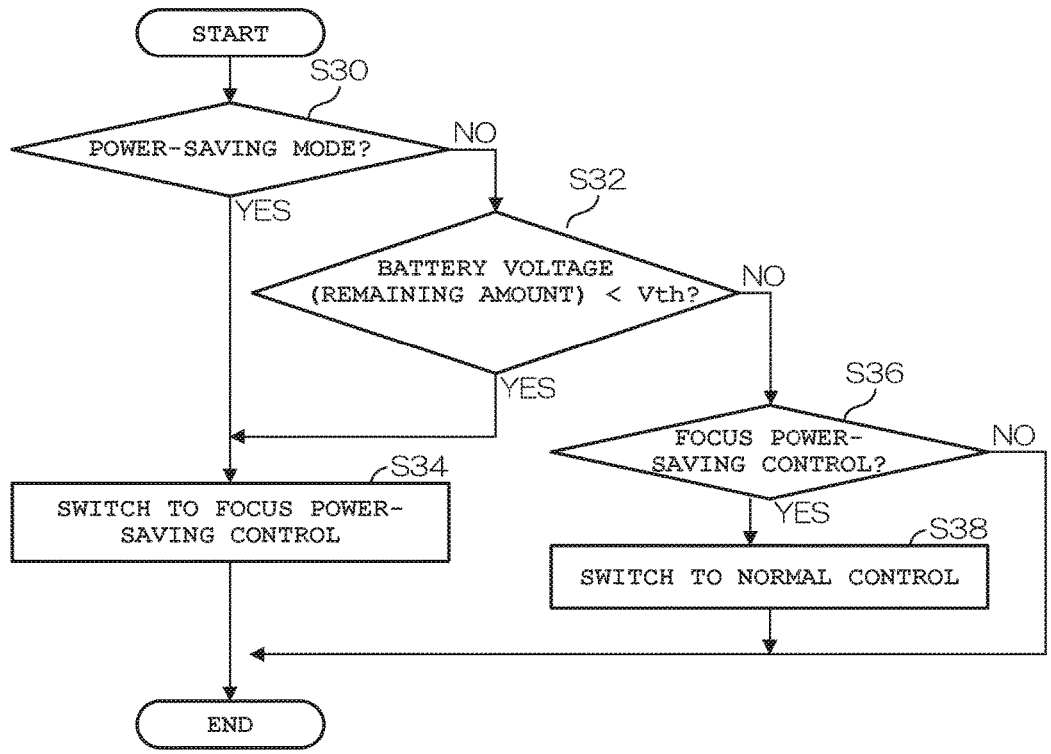
FIG. 7 is a flowchart for describing a third switching operation for switching to focus power-saving control according to the first embodiment.

FIG. 7 is a flowchart for describing a third switching operation of switching control for an AF operation to focus power-saving control, in the first embodiment. The third switching operation is characterized in switching control for an AF operation to focus power-saving control or normal control based on a combination of a remaining battery level and an operation mode. Note that the operation mode of the camera is set by the user as necessary.

The processing shown in FIG. 7 is repeatedly performed by the CPU 17 at the time of power-on and at predetermined time intervals. First, the CPU 17 judges whether the power-saving mode has been set as an operation mode (Step S30). When the power-saving mode has been set as an operation mode (YES at Step S30), the CPU 17 switches control for an AF operation to focus power-saving control (Step S34), and ends the processing. That is, when the power-saving mode has been set as an operation mode, control for an AF operation is automatically switched to focus power-saving control.

Conversely, when the power-saving mode has not been set as an operation mode (NO at Step S30), the CPU 17 judges whether the battery voltage (remaining amount) is less than a predetermined threshold Vth (Step S32). When the battery voltage (remaining amount) is less than the predetermined threshold Vth (YES at Step S32), the CPU 17 switches control for an AF operation to focus power-saving control (Step S34), and ends the processing. That is, even if the power-saving mode has not been set, the CPU 17 switches control for an AF operation to focus power-saving control when the battery voltage (remaining amount) is less than the predetermined threshold Vth.

When the power-saving mode has not been set as an operation mode (NO at Step S30) and the battery voltage (remaining amount) is equal to or more than the predetermined threshold Vth (NO at Step S32), the CPU 17 judges whether focus power-saving control has been set as control for an AF operation (Step S36). When focus power-saving control has been set (YES at Step S36), the CPU 17 switches control for an AF operation to normal control (Step S38) and ends the processing.

Conversely, when focus power-saving control has not been set (NO at Step S36), the CPU 17 ends the processing without switching control for an AF operation (by maintaining normal control).

Next, an imaging operation with the above-described focus power-saving control is described.

Figure 8:
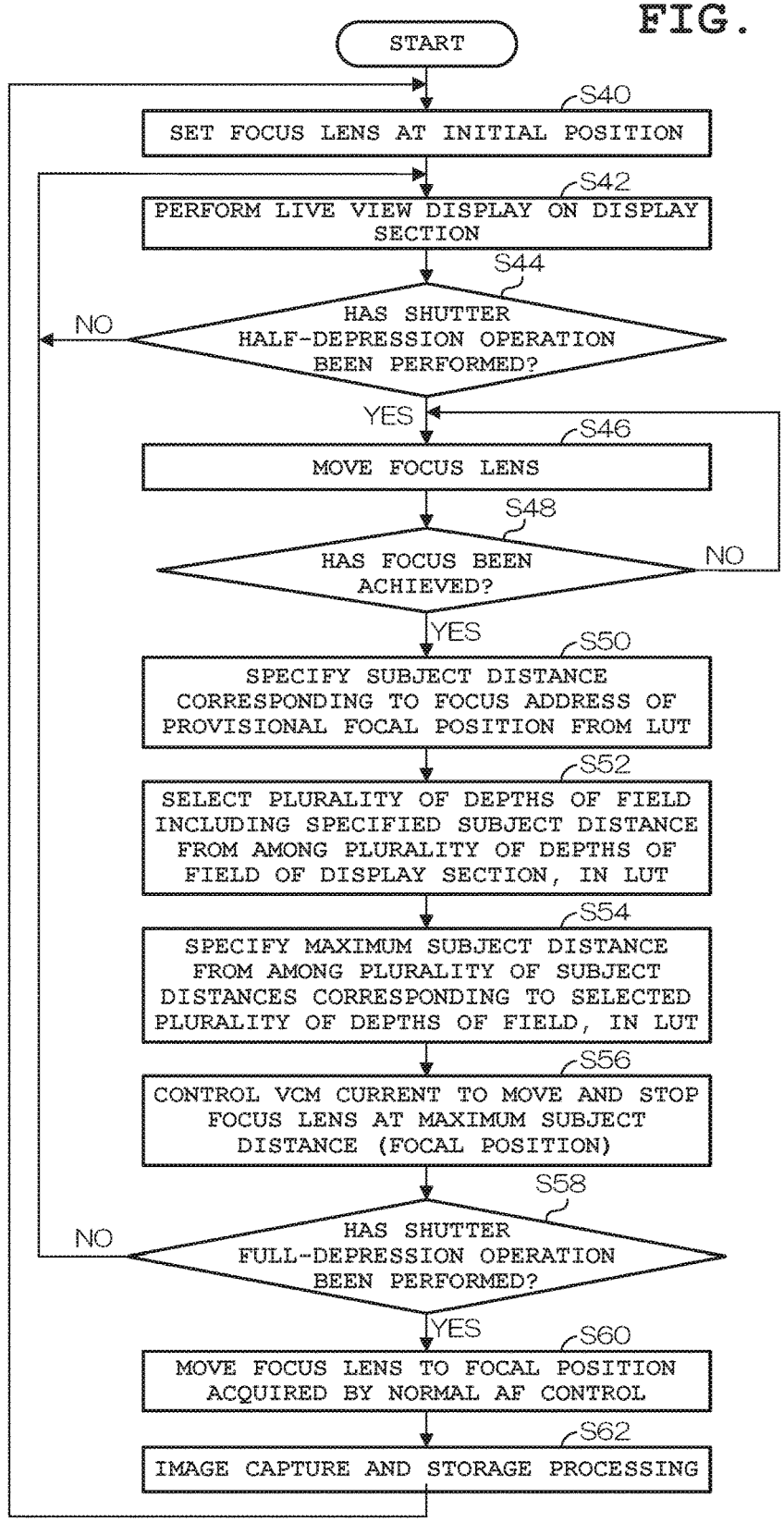
FIG. 8 is a flowchart for describing an imaging operation with focus power-saving control according to the first embodiment.

FIG. 8 is a flowchart for describing an imaging operation with focus power-saving control in the first embodiment. First, after power-on and an imaging mode is selected, the CPU 17 controls the focus lens driving section 16 to move the focus lens 11b to an initial position (back side; ∞) (Step S40). Next, the CPU 17 performs image processing on images acquired by the image sensor 12, and then causes the acquired image subjected to the image processing to be displayed on the display section 21 by live view display (Step S42).

Next, the CPU 17 judges whether the user has performed a shutter half-depression operation (Step S44). When no half-depression operation has been performed (NO at Step S44), the CPU 17 returns to Step 42 and continues the live view display.

Conversely, when a shutter half-depression operation has been performed (YES at Step S44), the CPU 17 once performs normal AF control (Steps S46 and S48). That is, the CPU 17 performs, for example, normal contrast AF control to control the focus lens driving section 16 to move the focus lens 11b to a close point side by a predetermined amount (Step S46), and judges whether a photographic subject has been brought into focus (Step S48). When no photographic subject has been brought into focus (NO at Step S48), the CPU 17 returns to Step S46, and repeatedly performs an operation of controlling the focus lens 11b to move to the close point side by the predetermined amount and judging whether the photographic subject has been brought into focus by analyzing images from the image sensor 12.

Then, when the focus lens 11b reaches a position corresponding to the subject distance and focuses on the photographic subject (YES at Step S48), the CPU 17 takes the focal position of the focus lens 11b where the focus has been achieved by the normal AF control at Steps S46 and S48 described above as a provisional focal position, accesses the LUT 30 shown in FIG. 4 with a focus address corresponding to this provisional focal position, and specifies a subject distance corresponding to the focus address of the provisional focal position (Step S50). Next, the CPU 17 selects, in the LUT 30, a plurality of depths of field including the specified subject distance from among a plurality of depths of field corresponding to subject distances from the close point to ∞ in accordance with the resolution of the display section 21 (Step S52).

For example, when the focus address of the provisional focal position is "34" as shown in FIG. 4, a subject distance of "75 mm" is specified. As a plurality of depths of field including the subject distance "75 mm", for example, 24-76, 34-790, 35-1150, ... , 73-∞, and 75-∞[mm] are selected. A plurality of subject distances corresponding to these depths of field are 37, ... , 68, 70, ... , 1250, 2500 [mm].

Next, the CPU 17 specifies, in the LUT 30, the maximum subject distance from among the plurality of subject distances corresponding to the selected plurality of depths of field (Step S54). In the case shown in FIG. 4, the maximum subject distance is 2500 [mm]. Next, the CPU 17 causes the focus lens driving section 16 to control the VCM current so as to move the focus lens 11b to a focal position corresponding to the maximum subject distance (Step S56). Note that the focal position of the focus lens 11b may be moved to any point within a range which is on the focal position side corresponding to the maximum subject distance rather than the provisional focal position (subject distance) of the focus lens 11b and is equal to or less than this focal position, that is, the focus lens stoppable range.

That is, the CPU 17 causes the focus lens driving section 16 to supply a VCM current in accordance with the focus address of the movement destination. As a result, the focus lens 11*b* moves to a position in accordance with the VCM current. Then, the focus lens 11*b* is stopped at the movement destination with the above-described VCM current being continuously supplied.

Here, as long as the movement destination of the focus lens 11*b* is within the above-described movable range which is on the focal position side corresponding to the maximum subject distance rather than the provisional focal position of the focus lens 11*b* and is equal to or less than this focal position (focus lens stoppable range of FIG. 3; the range does not include the provisional focal position), the VCM current (power consumption) is lower than that at the time of main image capturing when the focal position of the focus lens 11*b* is controlled by normal AF control. Accordingly, for example, control is performed in which the focus lens 11*b* is moved to the focal position (focus address) corresponding to the maximum subject distance where the VCM current is minimum.

That is, as indicated by portions surrounded by using bold lines in FIG. 4, when the focal position (provisional focal position) of the focus lens 11*b* in the normal AF control has a focus address "34", the focal position of the focus lens 11*b* is moved to a focal position (focus address) corresponding to the maximum subject distance (2500 mm) included in the depth of field corresponding to the provisional focal position (subject distance "75 mm"). More specifically, among the plurality of subject distances (37, . . . , 68, 70, . . . , 1250, 2500 [mm]) corresponding to the plurality of depths of field (24-76, 34-790, 35-1150, . . . , 73-∞, 75-∞ [mm]) including the provisional focal position "75 mm", a focus address "2" corresponding to the maximum distance of 2500 [mm] where power saving can be achieved most is used for the movement control of the focus lens 11*b*. At the focal position (focus address "2"), it is only required to continuously supply VCM current IB lower than VCM current IA that is required when the focal position is controlled to be at the provisional focal position "75 mm" in normal AF control. As a result, power saving can be achieved without the user recognizing a problem (the photographic subject is out of focus) in live view display.

As another method for determining the above-described movement destination, for example, the movement destination may be determined in accordance with the remaining battery level. In this case, a configuration may be adopted in which, when the remaining battery level is lower, a position closer to the maximum subject distance side is determined as a movement destination. Alternatively, a configuration may be adopted in which the power saving level is settable at any of a plurality of stages (for example, low, intermediate, high or 1 to 5 stages), and the movement destination is determined in accordance with the set stage of power saving. For example, if the stage is "low", the movement destination is set at a position closer to the provisional focal position acquired by the normal AF control, within the focus lens stoppable rage described with reference to FIG. 3. If the stage is "intermediate", the movement destination is set at an intermediate position between the provisional focal position and the maximum subject distance. If the stage is "high", the movement destination is set at a position closer to the maximum subject distance side.

Next, the CPU 17 judges whether the user has performed a shutter full-depression operation (YES at Step S58). When no full-depression operation has been performed (NO at Step S58), the CPU 17 returns to Step S42 to continue the live view display (Step S42) and the AF operation (Steps S46 to S56).

During or after the AF operation, images acquired by the image sensor are continuously displayed by live view display. Here, the focus lens 11*b* is moved to (stopped at) the movement destination (for example, the focal position corresponding to the maximum subject distance) within the focus lens stoppable range derived from the provisional focal position (subject distance). This stop position of the movement destination is not the provision focal position acquired by the normal AF control, but is within the range of the depth of field where focus is achieved in the display section 21. Thus, the photographic subject is seen to be in focus in the display section 21, and therefore no drawback occurs to the user.

On the other hand, When a shutter full-depression operation has been performed (YES at Step S58), the CPU 17 performs normal main imaging operation to perform Steps S60 and S62, and then returns to Step S40 to repeat the above-described processing. At this Step S60, the focus lens 11*b* is moved by the focus lens driving section 16 to the position where focus has been achieved at Step S48, that is, the focal position (provisional focal position) acquired in the normal AF control. In the above-described Step S62, after image processing is performed on an image captured by the image sensor 12, the resultant image is stored in the flash memory 20 or the memory card 24.

In the first embodiment, in main image capturing where a captured image is recorded in the recording medium, the focal position of the focus lens 11*b* is moved to a focal position acquired by normal AF control. However, the present disclosure is not limited thereto, and main image capturing may be performed with the focus lens 11*b* being stopped at a movement destination such as a focal position corresponding to a maximum subject distance. For example, in a case where an image to be recorded is not required to have high resolution (a bit out of focus) because the focal position of the focus lens 11*b* has deviated from the provisional focal position acquired by normal AF control, this does not pose a problem. In this case, main image capturing may be performed without returning the focus lens 11*b* to the provisional focal position. Whether to return the focus lens 11*b* to the provisional focal position in the main image capturing may be determined based on the number of pixels of an image to be recorded or may be selected by the user.

According to the above-described first embodiment, by focus power-saving control being performed in an AF operation, the VCM current is controlled such that the focus lens 11*b* is moved into and stopped within a range which is on a focal position side corresponding to a maximum subject distance rather than a provisional focal position acquired by normal AF control and is equal to or less than this focal position (focus lens stoppable range). Also, this maximum subject distance corresponds to a subject distance where the VCM current is lowest among a plurality of subject distances corresponding to a plurality of depths of field including the provisional focal position (subject distance). That is, the VCM current is controlled such that the focus lens 11*b* is moved into and stopped within the range where the power consumption of the motor during live view image capturing is lower than that at the time of main imaging capturing. Thus, in the digital camera 10 where the power consumption of the voice coil motor M for driving the focus lens 11*b* continuously changes in accordance with the focal position of the focus lens 11*b*, power consumption can be reduced at the time of driving the focus lens 11*b* without the user recognizing that the photographic subject is out of focus. Also, the reduction in power consumption can contribute to heat reduction, an increase in battery life and the like.

Second Embodiment

Next, a second embodiment of the present disclosure is described. Note that the structure of the digital camera 10 and the basic operation of the digital camera 10 in the second embodiment are similar to those of the above-described first embodiment and therefore only points different from the first embodiment are described.

In the above-described first embodiment, in the LUT 30, focus addresses (focal position of the focus lens 11b) at the time of focusing, subject distances, and depths of field in accordance with the resolution of the display section 21 have been tabulated in association with one another. By contrast, in the second embodiment, a LUT 40 is used in which focus addresses at the time of focusing and movement destination focus addresses when focus is achieved with these focus addresses have been tabulated in association with one another. As a result, the focus address of a movement destination can be easily acquired in which a VCM current is lower (power consumption is lower) than in a case where the focal position of the focus lens 11b is controlled to be at a provisional focus position. This LUT 40 is set in advance at the time of manufacture of the digital camera 10 and is stored in the memory 19, as with the LUT 30.

Figure 9:
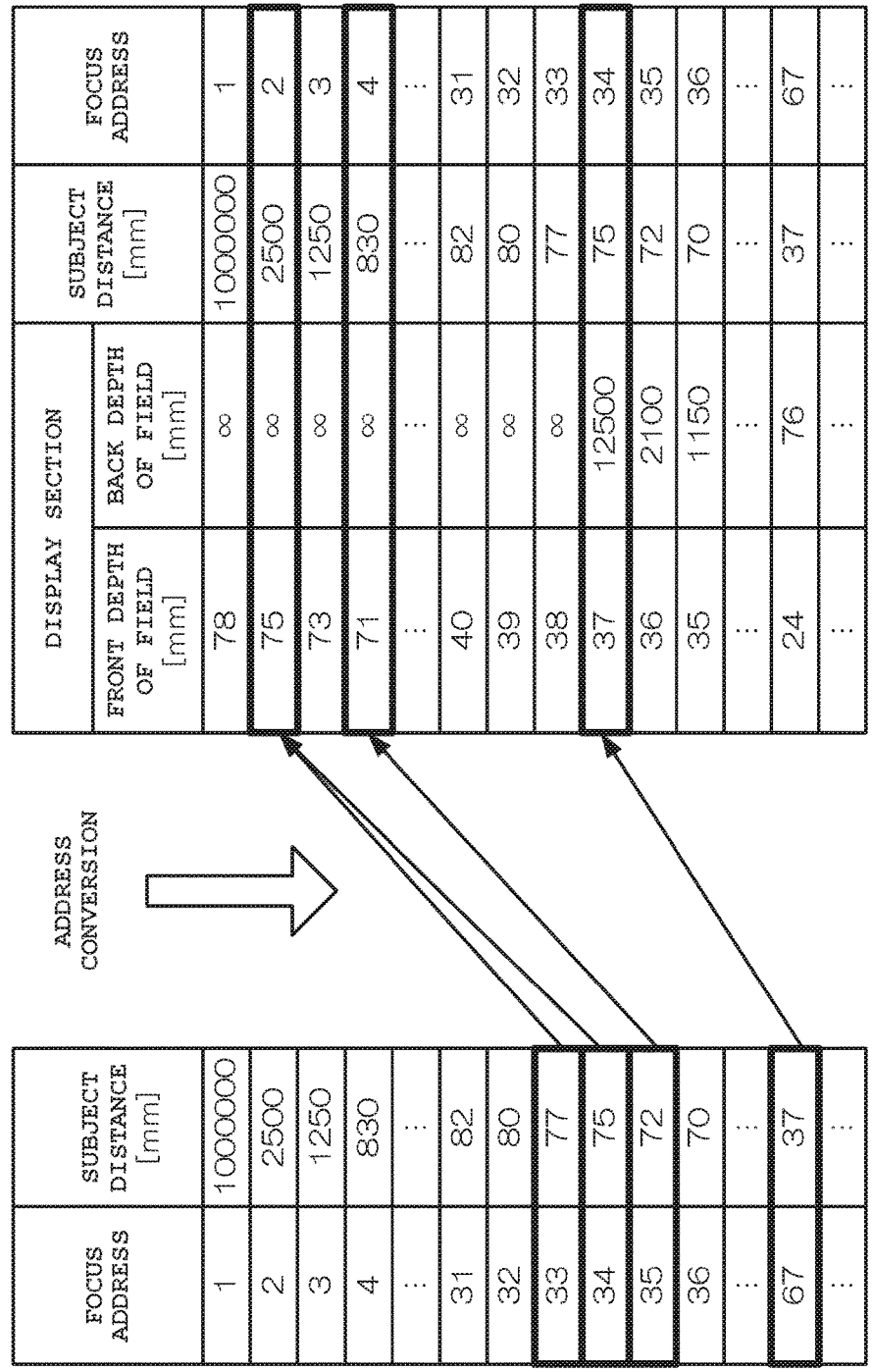
FIG. 9 is a conceptual diagram showing an example of conversion from a focus address of a provisional focal position (subject distance) to a focus address in focus power-saving control according to a second embodiment.

FIG. 9 is a conceptual diagram showing an example of conversion from the focus address of a provisional focal position (subject distance) to a focus address corresponding to a maximum subject distance for acquiring a depth of field including the provisional focal position (subject distance), in the second embodiment.

In the above-described first embodiment, from a provisional focal position (focus address) of the focus lens 11b, a plurality of depths of field in accordance with the resolution of the display section 21 including the provisional focal position are selected, as shown in FIG. 4. Subsequently, from the selected plurality of depths of field, a subject distance corresponding to the focal position of a movement destination is specified. Then, a focus address corresponding to the specified subject distance is determined. As described above, a front depth of field and a back depth of field each correspond to a distance to a photographic subject where the user recognizes that the photographic subject is in focus in a live view image. Therefore, by performing predetermined address conversion, a focus address in accordance with the subject distance corresponding to the front depth of field and the back depth of field can be derived, as shown FIG. 9.

For example, when a focus address at the time of focusing in normal AF control is "33" (subject distance is 77 mm), depths of field corresponding to a maximum subject distance among depths of field including the subject distance (77 mm) are a front depth of field (75 mm) and a back depth of field (∞). When address conversion is performed on the maximum subject distance (2500 mm) corresponding to these depths of field, the focus address is "2". Also, when a focus address at the time of focusing is "34" (subject distance is 75 mm), depths of field corresponding to a maximum subject distance among depths of field including the subject distance (75 mm) are a front depth of field (75 mm) and a back depth of field (∞) which are the same as those in the case of the subject distance (77 mm). When address conversion is performed on the maximum subject distance (2500 mm) corresponding to these depths of field, the focus address is "2". Furthermore, when a focus address at the time of focusing is "35" (subject distance is 72 mm), depths of field corresponding to a maximum subject distance among depths of field including the subject distance (72 mm) are a front depth of field (71 mm) and a back depth of field (∞). When address conversion is performed on the maximum subject distance (830 mm) corresponding to these depths of field, the focus address is "4". Still further, when a focus address at the time of focusing is "67" (subject distance is 37 mm), depths of field corresponding to a maximum subject distance among depths of field including the subject distance (37 mm) are a front depth of field (37 mm) and a back depth of field (12500 mm). When address conversion is performed on the maximum subject distance (75 mm) corresponding to these depths of field, the focus address is "34".

Figure 10:
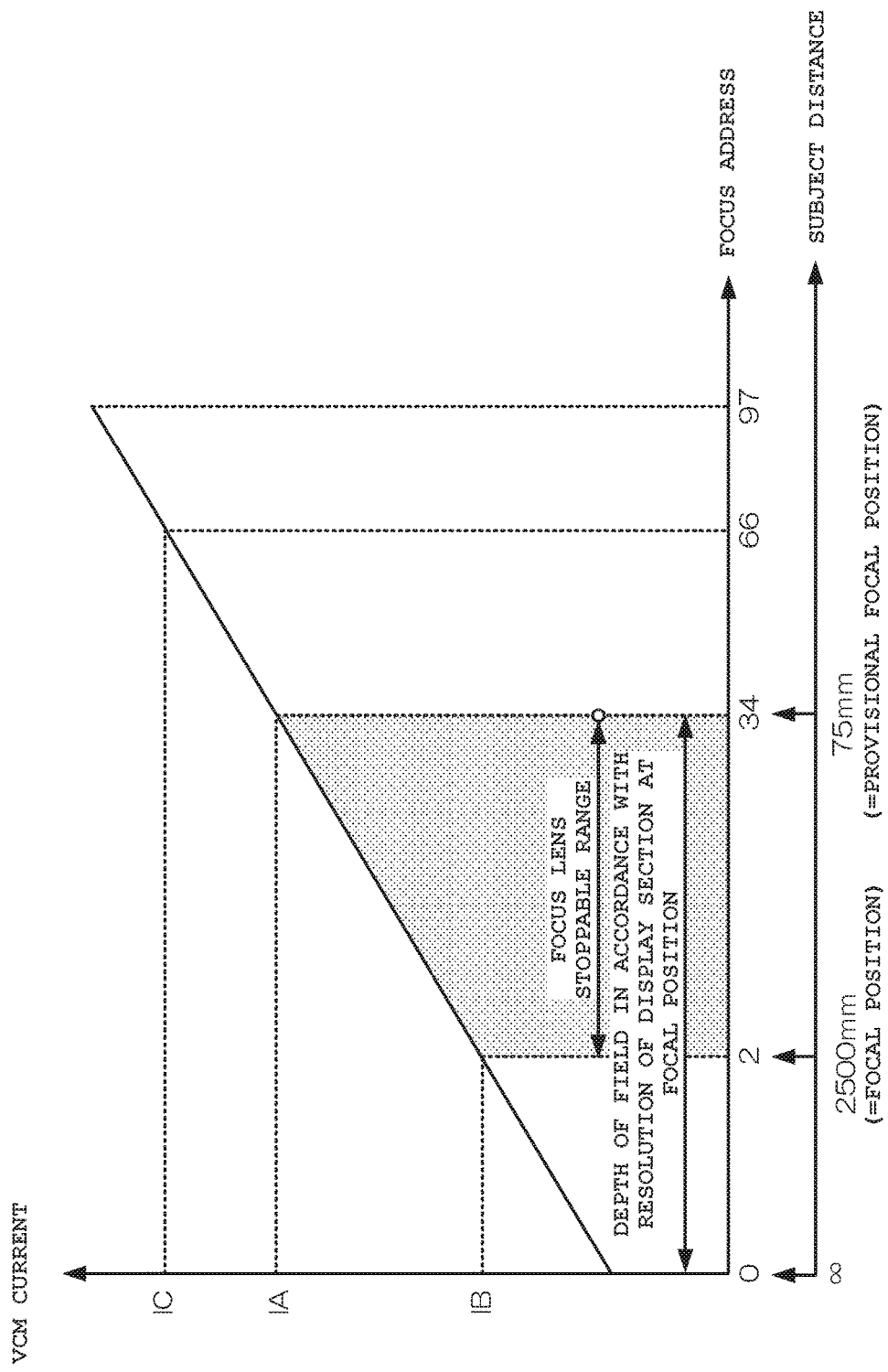
FIG. 10 is a conceptual diagram showing an example of a focus lens stoppable range according to the second embodiment, in which the user does not recognize that a photographic subject is out of focus and power saving can be achieved.

FIG. 10 is a conceptual diagram showing an example of an optimal focus lens stop position range according to the second embodiment. In FIG. 10, the vertical axis represents a VCM current that is supplied to the voice coil motor M for driving the focus lens 11b, and the horizontal axes represent a focus address of the focus lens 11b and a subject distance corresponding to the focus address. For example, when focus is achieved at a subject distance of 75 [mm] by normal AF control, a provisional focal position as a focal position at this time corresponds to a focus address "34", as shown in FIG. 10. As described above, when a focus address at the time of focusing is "34", the subject distance is "75 mm". Depths of field corresponding to a maximum subject distance among depths of field including the subject distance "75 mm" are a front depth of field (75 mm) and a back depth of field (∞), and the maximum subject distance corresponding to these depths of field is "2500 mm". When they are subjected to address conversion, a focus address "2" corresponding to the subject distance (2500 mm) is acquired. Therefore, in order to decrease the VCM current, a range lower than the focus address "34" corresponding to the provisional focal position and equal to or more than the focus address "2" corresponding to the maximum subject distance "2500 mm", such as a range not including the provisional focal position (focus address "34") (indicated by a white circle in FIG. 10) from a focus address "33 (=34−1)" to the focus address "2", serves as a focus lens stoppable range.

Accordingly, in the second embodiment, the LUT 40 is provided in which focus addresses corresponding to maximum subject distances described above have been associated with focal positions (focus addresses) of the focus lens 11b at the time of focusing, in a table.

Figure 11:
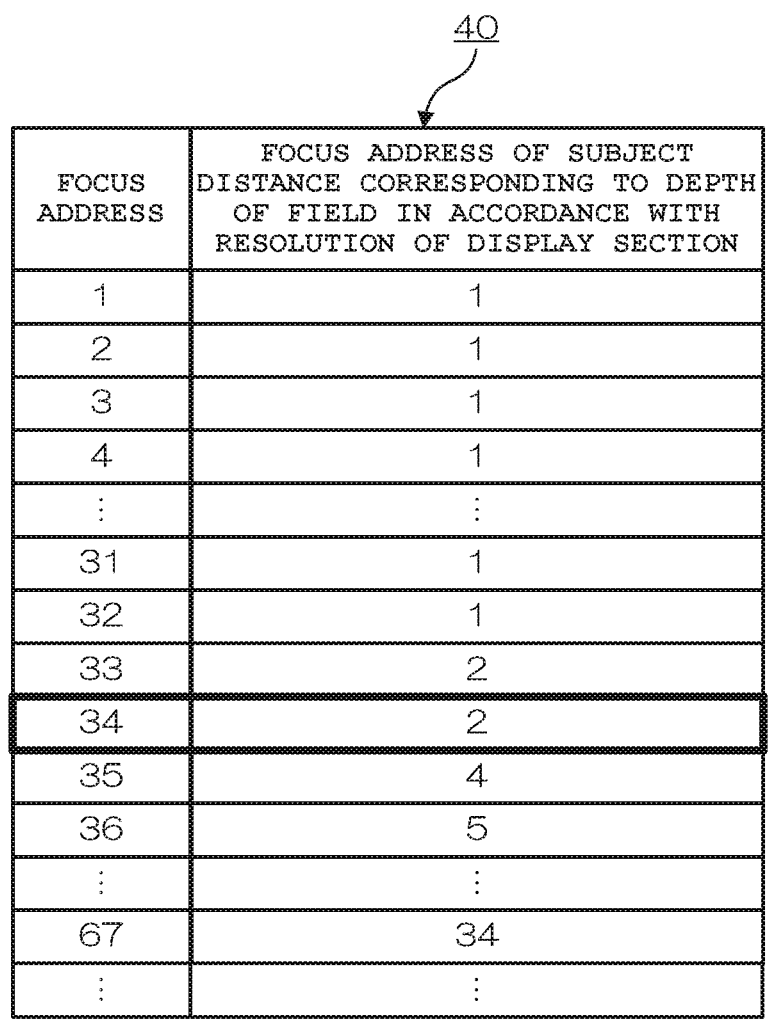
FIG. 11 is a conceptual diagram showing a LUT for deriving a focus address in a focus lens stoppable range, according to the second embodiment.

FIG. 11 is a conceptual diagram of the LUT 40 for deriving a focus lens stop position (stoppable range; focus address) in the second embodiment. As described above, the second embodiment is provided with the LUT 40 capable of uniquely determining a focus address corresponding to a maximum subject distance from a focal position (focus address) of the focus lens 11b acquired by normal AF control, as shown in FIG. 11.

As with the above-described first embodiment, each depth of field in accordance with the resolution of the display section 21 depends on an aperture value at the time of image capturing. FIG. 11 shows the LUT 40 storing therein back depths of field in the case of a predetermined aperture value. In an imaging apparatus with a fixed aperture value (F value), the LUT 40 is provided which has stored therein focus addresses indicating focal positions of final movement destinations for the predetermined aperture value as shown in FIG. 11. By contrast, in a case where this aperture value (F value) is automatically set or set by the user, for example, the LUT 40 shown in FIG. 11 is provided for each aperture value that can be taken at the time of image capturing. Then, in AF control, a corresponding LUT 40 is selected based on an aperture value at that time, the selected LUT 40 is accessed with a focus address corresponding to a provisional focal position (subject distance), and a focus address indicating the focal position of a final movement destination is found.

In an AF operation, When a photographic subject is brought into focus by normal AF control and the focus lens 11*b* is controlled to be at a provisional focal position, the CPU 17 acquires the aperture value and the focal position (focus address) of the focus lens 11*b* at that time, accesses the LUT 40 with the focus address corresponding to the provisional focal position, and acquires a focus address corresponding to the focal position (maximum subject distance) of a final movement destination in accordance with the focus address corresponding to the provisional focal position. Then, the CPU 17 controls the VCM current such that the focal position of the focus lens 11*b* is moved into and stopped within a focus lens stoppable range (such as a range from the focus address corresponding to the provisional focal position minus 1 to the focus address corresponding to the maximum subject distance).

For example, as indicated by portions surrounded by bold lines in FIG. 11, if a photographic subject is brought into focus by normal AF control when the focus lens 11*b* is at a provisional focal position corresponding to a focus address "34" and the LUT 40 is accessed with that focus address, "2" is acquired as a focus address corresponding to a maximum subject distance. Then, the CPU 17 controls the focus lens driving section 16 to move the focus lens 11*b* to a focal position corresponding to the focus address "2".

According to the above-described second embodiment, a focus address corresponding to the focal position of a final movement destination is directly acquired from a provisional focal position (focus address) of the focus lens 11*b*. As a result of this configuration, a focus address corresponding to the focal position of a final movement destination can be more easily acquired. Also, power consumption at the time of driving the focus lens 11*b* can be reduced without the user recognizing that the photographic subject is out of focus.

Third Embodiment

Next, a third embodiment of the present disclosure is described. Note that the structure of the digital camera 10 and the basic operation of the digital camera 10 in the third embodiment are similar to those of the above-described first embodiment and therefore only points different from the first embodiment are described.

In the digital camera 10, the focus lens 11*b* may be deviated from its original focal position with respect to a subject distance due to the individual difference, the orientation of the digital camera 10 at the time of image capturing (image capturing of a higher area or a lower area), or the like. For example, even if an actual subject distance is 75 mm, focus may be achieved at a position deviated from it (for example, a subject distance of 70 mm). If the focal position (subject distance) is deviated, the front depth of field and the back depth of field, and their corresponding subject distance are changed. As a result, the focus lens stoppable range is changed, and therefore the VCM current cannot be effectively reduced. Moreover, depending on the amount of the deviation, there is a possibility that the photographic subject goes out of focus.

In the third embodiment, when it is judged based on the individual difference or the orientation of the digital camera 10 at the time of image capturing that the focal position of the focus lens 11*b* has been deviated, the deviated focal position is corrected in accordance with an amount of deviation measured in advance or an amount of deviation measured sequentially, a maximum subject distance or focus address is acquired from the LUT 30 or 40 based on the corrected focal position, and a focus lens stoppable range is derived. Note that the amount of deviation due to the individual difference of the digital camera 10 may be written in advance in the DRAM 18 or the like at the time of shipping or the like or may be measured sequentially by the gyro sensor 25. Also, whether the orientation will cause a deviation may be judged based on a detection result by the gyro sensor 25.

FIG. 12 is a conceptual diagram for describing a method of determining a focus lens stoppable range when the deviation amount of the focal position of the focus lens 11*b* is taken into consideration in the third embodiment, and shows, for each subject distance (focal position), a correspondence relation with a front depth of field and a back depth of field in accordance with the number of recording pixels of image data recorded on the recording medium of the digital camera 10 and a front depth of field and a back depth of field in accordance with the resolution of the display section 21. First, when the deviation of the focal position of the focus lens 11*b* has not occurred, for example, a focus address with respect to a photographic subject at a subject distance "72 mm" at the time of focusing is "35". In this case, among depths of field including the subject distance "72 mm", depths of field corresponding to a maximum subject distance are a front depth of field "71 mm" and a back depth of field "∞", and the maximum subject distance is "830 mm" and the focus address is "4".

By contrast, for example, in a case where an amount of deviation "−2" in focus address has occurred at the focal position of the focus lens 11*b* due to the individual difference or the orientation of the digital camera 10 at the time of image capturing (image capturing of a higher area or a lower area), a focal address with respect to a photographic subject at a subject distance "72 mm" at the time of focusing is "33" (subject distance "77 mm"). Unless the deviation is corrected, depths of field corresponding to a maximum subject distance among depths of field including the subject distance "77 mm" are a front depth of field "75 mm" and a back depth of field "∞", and the maximum subject distance is "2500 mm" and the focus address is "2", as shown in FIG. 12. Thus, by correcting the focus address to an address "35" (subject distance "72 mm") corresponding to the original focal position based on the amount of deviation "−2", a maximum subject distance "830 mm" and a focus address "4" can be acquired.

Figure 13:
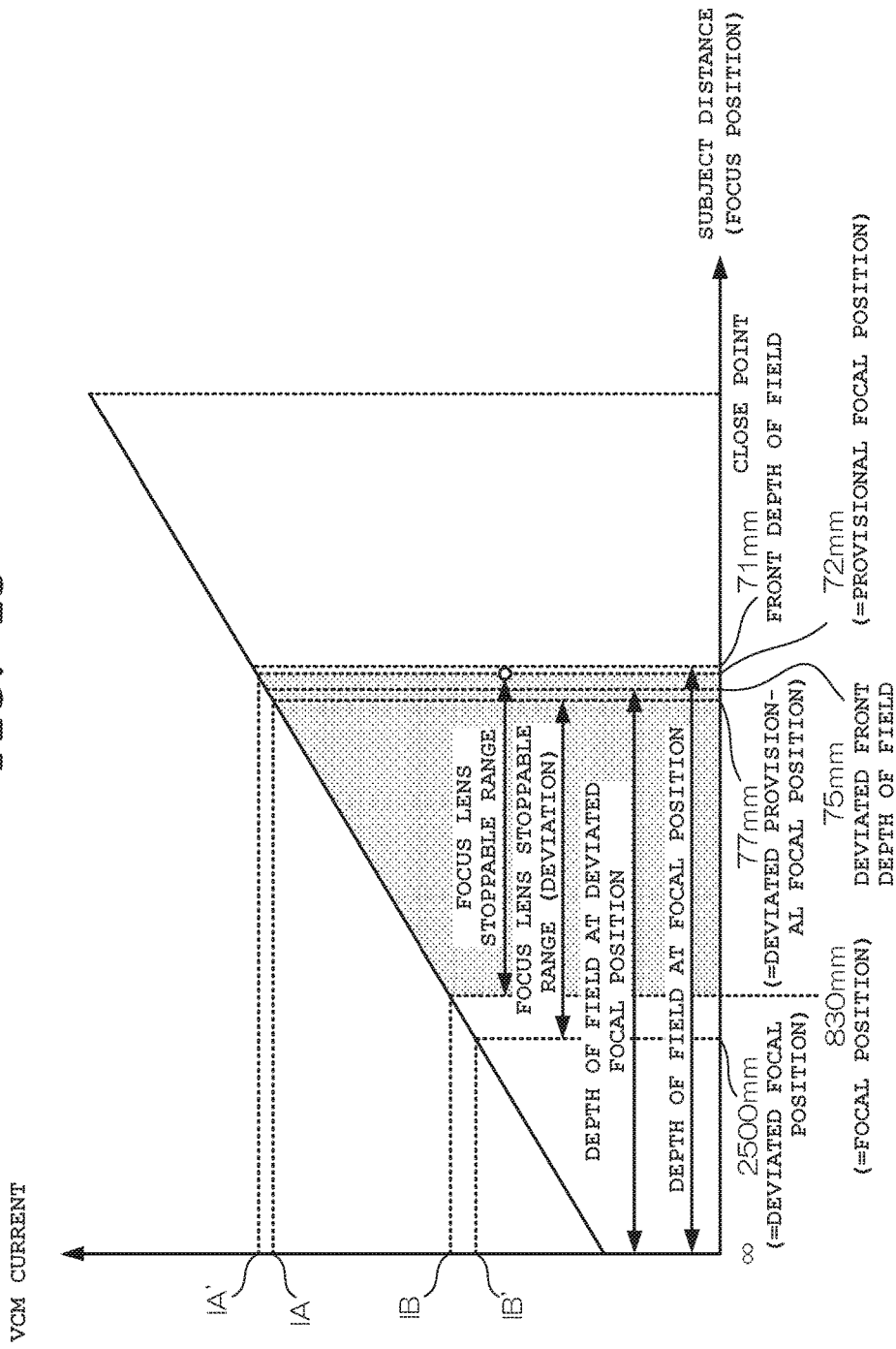
FIG. 13 is a conceptual diagram showing an example of a focus lens stoppable range according to the third embodiment.

FIG. 13 is a conceptual diagram showing an example of a focus lens stoppable range according to the third embodiment. In FIG. 13, the vertical axis represents a VCM current for driving the focus lens 11*b* and the horizontal axis represents a subject distance corresponding to the position of the focus lens 11*b*. As described above, in a case where an amount of deviation "−2" in focus address occurs at the focal position of the focus lens 11*b*, the focus address of a focal position with respect to a photographic subject at an original subject distance "72 mm" is "33" (subject distance "77 mm").

Thus, based on the amount of deviation "−2", the focus address is corrected to "35" (subject distance "72 mm"). Then, by using the focus address "35" (subject distance "72 mm"), a front depth of field "71 mm" and a back depth of field "∞" are specified as depths of field corresponding to a maximum subject distance among depths of field including the subject distance "72 mm" corresponding to "35", and a maximum subject distance "830 mm" and a focus address "4" are acquired. As a result, the focus lens stoppable range is higher than the corrected provisional focal position "72 mm" and equal to or less than the maximum subject distance "830 mm" (not including the provisional focal position), as shown in FIG. 13. For example, when represented in focus address, the range is 34 (=35–1) to 4. Then, the movement destination of the focus lens 11b is set as, for example, a maximum subject distance "830 mm" (focus address "4"). That is, by the deviation amount of the focal position being grasped in advance, and the focus lens stoppable range being set to be higher than the corrected subject distance "72 mm" and equal to or less than the maximum subject distance "830 mm", inconvenience is prevented even if deviation due to the individual difference, the orientation at the time of imaging, or the like occurs. Unless the deviation is corrected, depths of field corresponding to the subject distance "77 mm" (deviated subject distance) are a deviated front depth of field "75 mm" and a deviated back depth of field "∞", and the deviated maximum subject distance is "2500 mm" and the focus address is "2". As a result, the original subject distance "72 mm" (provisional focal position) is not included in the depths of field at the deviated focal position formed of the deviated front depth of field and back depth of field as shown in FIG. 13, and the photographic subject is recognized to be out of focus on a live view image.

According to the above-described third embodiment, even if the focus lens 11b is deviated from its original focal position with respect to a subject distance, a focus lens stoppable range can be set in accordance with the amount of the deviation. As a result of this configuration, the occurrence of inconvenience due to the deviation of a focal position can be prevented.

In the above-described first to third embodiments, by the use of the LUT 30 or 40 set in advance at the time of manufacture of the focal control device 1, a plurality of depths of field including a provisional focal position are selected from a plurality of depths of field in accordance with the resolution of the display section 21, and a maximum subject distance among a plurality of subject distances corresponding to the selected plurality of depths of field or a focus address corresponding to the maximum subject distance is acquired. However, the present disclosure is not limited thereto, and a configuration may be adopted in which, by the use of the above-described Equations 1 to 3, a maximum subject distance or a focus address corresponding to the maximum subject distance is sequentially acquired (calculated).

Also, in the above-described first to third embodiments, a back depth of field in accordance with the resolution of the display section 21 is found from the plurality of LUTs 30 or 40 provided in advance for each aperture value. However, the present disclosure is not limited thereto, and a configuration may be adopted in which, every time AF control is performed, a back depth of field is calculated based on an aperture value and a provisional focal position at that time by using the above-described Equations 1 to 3. With this configuration, the memory capacity can be significantly reduced.

Moreover, in the above-described first to third embodiments, the present disclosure has been applied to the digital camera 10 that is an imaging apparatus having the voice coil motor M. However, the present disclosure is not necessarily required to be applied to an imaging apparatus having a voice coil motor and can be applied to an imaging apparatus including another actuator in which power consumption (electric power) continuously changes in accordance with the focal position of a focus lens. Actuators in this case include, for example, an actuator having a general DC motor and a general ball screw combined together to convert the rotation motive power of the DC motor into a reciprocating motion of a screw shaft or a nut of the ball screw.

Furthermore, in the above-described first to third embodiments, the present disclosure has been applied to the digital camera 10. However, the present disclosure can be applied not only to a digital camera but also to another device having a camera section and a display section, such as a smartphone.

Still further, in the above-described first to third embodiments, a range in which the user does not recognize that a photographic subject is out of focus in a live view image is taken as a stop range of the focus lens 11b. However, in a case where image capturing is performed without the focus lens 11b returning to a provisional focus position at the time of main image capturing, the focus lens stoppable range (stop position) may be determined based on a depth of field in accordance with the number of recording pixels of the imaging apparatus. In this case, when the number of recording pixels is higher, the depth of field in accordance with the number of recording pixels is lower. Therefore, the focal position of the focus lens for power saving is controlled to be closer to the provisional focal position acquired by normal AF control.

Figure 14:
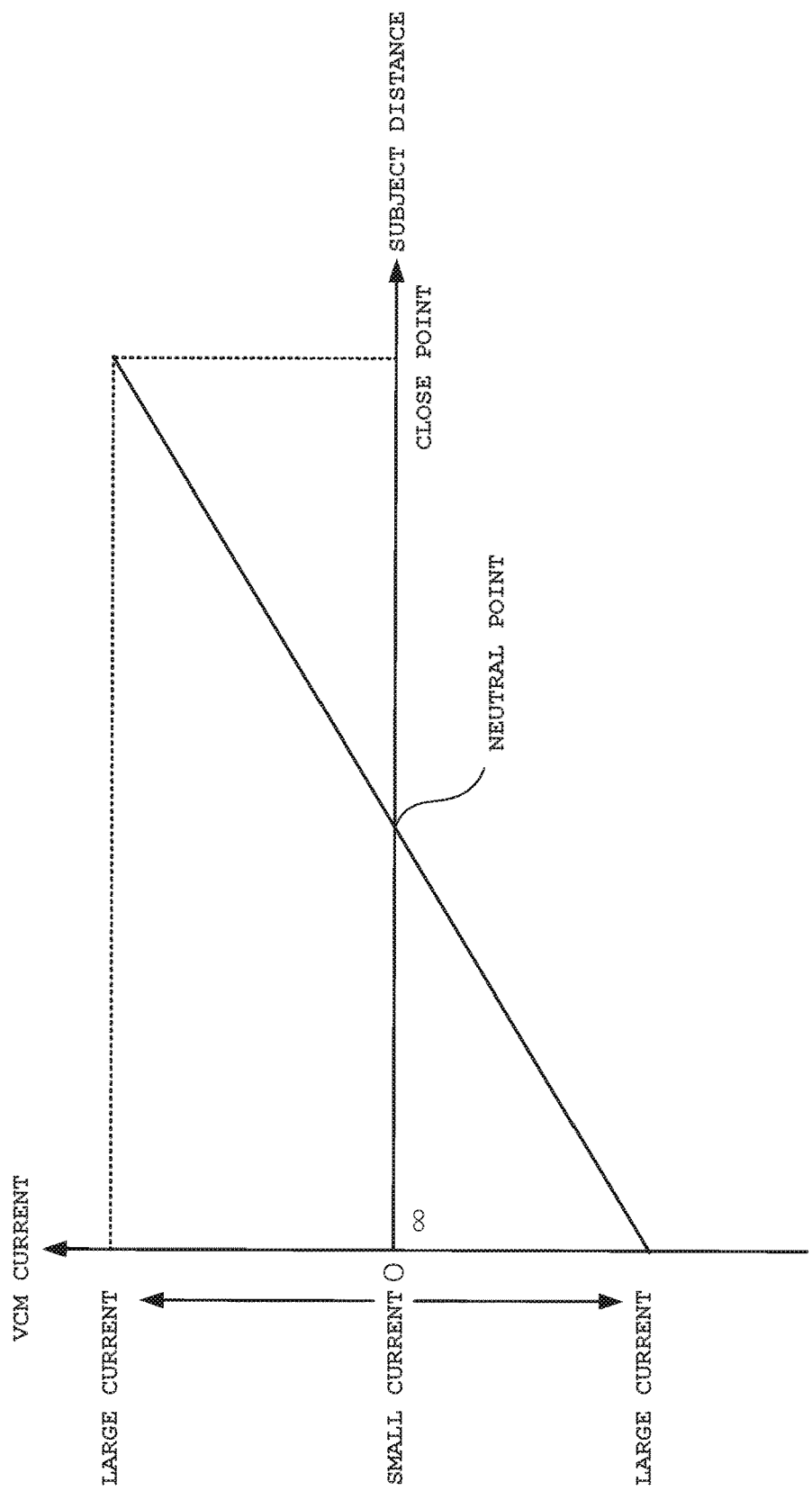
FIG. 14 is a conceptual diagram showing an example of a current change characteristic with respect to a subject distance which is different from that of FIG. 3.

Yet still further, in the above-described first to third embodiments, the imaging apparatus having the current change characteristic shown in FIG. 3 with respect to a subject distance (focus lens position) is a target. However, an imaging apparatus having a current change characteristic shown in FIG. 14 with respect to a subject distance may be a target. In this case as well, basically, an optimum focus lens stop position range is determined such that the stop position of the focus lens 11b is located on a neutral point (a position where the VCM current is zero) side. In the case where an imaging apparatus has the current change characteristic shown in FIG. 14 with respect to a subject distance, a provisional focal position when a photographic subject is brought into focus by normal AF control can be directly adopted as a focal position.

Yet still further, in the above-described first to third embodiments, the imaging apparatus is a target which has the current change characteristic shown in FIG. 3 with respect to a subject distance (focus lens position), in which the VCM current is minimum when the subject distance is ∞ and the VCM current increases as the subject distance is closer to the close point. However, there may be an imaging apparatus having a current change characteristic with respect to a subject distance (focus lens position) in which the VCM current is maximum when the subject distance is ∞ and the VCM current decreases as the subject distance is closer to the close point. In this case, a plurality of depths of field including a provisional focal position are selected from among a plurality of depths of field in accordance with the resolution of the display 21 which correspond to subject distances from the near point to ∞, a minimum subject distance is specified from a plurality of subject distances corresponding to the selected plurality of depth of field, and a range lower than a subject distance corresponding to the provisional focal position and equal to or more than the minimum subject distance is defined as a focus lens stop position range (however, the provisional focal position is not included).

Yet still further, in the above-described first to third embodiments, a focus lens stoppable range is defined based on a subject distance corresponding to a depth of field in accordance with the resolution (the number of pixels) of the display section 21 specified based on a provisional focal position (subject distance), and the provisional focal position (subject distance). However, the present disclosure is not limited thereto, and a configuration may be adopted in which a focus lens stop position range is specified based on a subject distance corresponding to a depth of field in accordance with the number of recording pixels specified by a provisional focal position (subject distance), and the provisional focal position (subject distance).

Yet still further, in the above-described first to third embodiments, a subject distance is specified by using a focal address corresponding to the focal position of the focus lens 11b. However, the present disclosure is not limited thereto, and a configuration may be adopted in which the position of the focus lens is specified based on a detection signal from a sensor (such as a Hall element) provided to detect the position of the focus lens and a subject distance is specified based on the specified position of the focus lens.

Yet still further, although the contrast control and the phase-difference (passive) control have been described as the normal AF control, a configuration may be adopted in which a provisional focal position is acquired, that is, a subject distance is specified by active AF (with a distance measurement sensor).

Yet still further, as a modification of the above-described first to third embodiments, a configuration may be adopted in which a plurality of focus stop position ranges are stored in advance and a focus stop position range for power-saving control is selected from these focus stop position ranges based on a provisional focal position.

While the present disclosure has been described with reference to the preferred embodiments, it is intended that the disclosure be not limited by any of the details of the description therein but includes all the embodiments which fall within the scope of the appended claims.

The invention claimed is:

1. A focus control device that is applied to an imaging apparatus where power consumption of a motor continuously changes in accordance with a focal position change of a focus lens driven by the motor, and controls a focal position of the focus lens, comprising:
   a processor,
   wherein the processor (i) acquires a first focal position where a photographic subject is in focus by following a predetermined control rule, (ii) performs first control processing of controlling the motor such that the focus lens stops at the first focal position, and (iii) performs second control processing of controlling the motor such that the focus lens stops at a second focal position different from the first focal position, and
   wherein the second focal position is a focal position where a user does not recognize that the photographic subject is out of focus in an output from the imaging apparatus, and power consumption for stopping the focus lens is lower than power consumption for driving the motor so as to stop the focus lens at the first focal position.

2. The focus control device according to claim 1, wherein the processor performs the first control processing when main image capturing is performed in which an image captured by the imaging apparatus is recorded, and performs the second control processing when live view image capturing is performed in which images captured by the imaging apparatus are displayed on an output section.

3. The focus control device according to claim 1, wherein the second focal position is a focal position within a range defined by the first focal position.

4. The focus control device according to claim 3, wherein the range is selected based on the first focal position from among a plurality of predetermined ranges defined in advance based on a plurality of predetermined different focal positions and resolution of the output from the imaging apparatus.

5. The focus control device according to claim 3, wherein the range corresponds to a depth of field specified by resolution of the output from the imaging apparatus and the first focal position, and is defined based on a focal position where the power consumption of the motor is lower than power consumption when the first focal position is the focal position of the focus lens, and the first focal position.

6. The focus control device according to claim 5, wherein resolution of a display which displays a live view image acquired when live view image capturing is performed by the imaging apparatus corresponds to the resolution of the output from the imaging apparatus.

7. The focus control device according to claim 5, wherein the imaging apparatus is configured to record a captured image with a predetermined number of recording pixels, and wherein the predetermined number of recording pixels corresponds to output resolution of the imaging apparatus.

8. The focus control device according to claim 1, wherein the processor judges whether a storage battery device which supplies electric power to the motor is in a predetermined low charge state, and performs the second control processing when the storage battery device is judged to be in the predetermined low charge state.

9. The focus control device according to claim 1, wherein the imaging apparatus has, as an operation mode, a power-saving mode that is set by a user, and wherein the processor performs the second control processing when the power-saving mode is set in the imaging apparatus.

10. The focus control device according to claim 1, wherein the motor is a voice coil motor.

11. The focus control device according to claim 1, wherein the second focal position is a focal position within a range defined in accordance with a depth of field specified based on resolution of the output from the imaging apparatus and the first focal position.

12. The focus control device according to claim 1, wherein the motor and the focus lens are provided in the focus control device.

13. A focus control method that is applied to an imaging apparatus where power consumption of a motor continuously changes in accordance with a focal position change of a focus lens driven by the motor, and controls a focal position of the focus lens, comprising:
   acquiring a first focal position where a photographic subject is in focus by following a predetermined control rule;
   performing first control processing of controlling the motor such that the focus lens stops at the first focal position; and
   performing second control processing of controlling the motor such that the focus lens stops at a second focal position different from the first focal position,
   wherein the second focal position is a focal position where a user does not recognize that the photographic subject is out of focus in an output from the imaging apparatus, and power consumption for stopping the focus lens is lower than power consumption for driving the motor so as to stop the focus lens at the first focal position.

14. A non-transitory computer-readable storage medium having stored thereon a program that is executable by a computer in a focus control device that is applied to an imaging apparatus where power consumption of a motor continuously changes in accordance with a focal position change of a focus lens driven by the motor and controls a focal position of the focus lens, the program being executable by the computer to actualize functions comprising:

acquiring a first focal position where a photographic subject is in focus by following a predetermined control rule;

performing first control processing of controlling the motor such that the focus lens stops at the first focal position; and performing second control processing of controlling the motor such that the focus lens stops at a second focal position different from the first focal position, wherein the second focal position is a focal position where a user does not recognize that the photographic subject is out of focus in an output from the imaging apparatus, and power consumption for stopping the focus lens is lower than power consumption for driving the motor so as to stop the focus lens at the first focal position.

\* \* \* \* \*